US008599904B2

(12) United States Patent
An et al.

(10) Patent No.: US 8,599,904 B2
(45) Date of Patent: Dec. 3, 2013

(54) METHOD AND APPARATUS FOR SOFTWARE GPS RECEIVER

(75) Inventors: Wei An, Waltham, MA (US); Yosef Stein, Sharon, MA (US)

(73) Assignee: Analog Devices, Inc., Norwood, MA (US)

( * ) Notice: Subject to any disclaimer, the term of this patent is extended or adjusted under 35 U.S.C. 154(b) by 703 days.

(21) Appl. No.: 12/362,994

(22) Filed: Jan. 30, 2009

(65) Prior Publication Data

US 2010/0194635 A1   Aug. 5, 2010

(51) Int. Cl.
   *H04B 1/00*   (2006.01)
(52) U.S. Cl.
   USPC ............................................ 375/148; 375/348
(58) Field of Classification Search
   USPC ......................................... 375/140–153, 346
   See application file for complete search history.

(56) References Cited

U.S. PATENT DOCUMENTS

| | | | | |
|---|---|---|---|---|
| 6,088,384 | A * | 7/2000 | Hindman | 375/150 |
| 6,512,720 | B1 * | 1/2003 | Yang | 367/134 |
| 6,608,589 | B1 * | 8/2003 | Devereux et al. | 342/357.29 |
| 2002/0161522 | A1 * | 10/2002 | Cohen et al. | 701/213 |
| 2007/0008195 | A1 * | 1/2007 | Jin | 341/61 |
| 2007/0027627 | A1 * | 2/2007 | Lawrence et al. | 701/213 |
| 2008/0317182 | A1 * | 12/2008 | Zhang et al. | 375/355 |

FOREIGN PATENT DOCUMENTS

WO   WO-2009/003092 A1   12/2008

OTHER PUBLICATIONS

International Search Report for PCT Application No. PCT/US2010/022724, mailed Jul. 19, 2010, 4 pages.
Written Opinion for PCT Application No. PCT/US2010/022724, mailed Jul. 19, 2010, 7 pages.
Namgoong et al. "GPS Receiver Design for Portable Applications," Acoustics, Speech and Signal Processing, 2000, ICASSP '00 Proceeding S. 2000, IEEE International Conference on Jun. 5-9, 2000, vol. 6, Jun. 5, 2000, pp. 3706-3709.
Sonowal et al. "Real Time GPS Software Receiver with New Fast Signal Tracking Method," Radio and Wireless Symposium, 2008, IEEE, Jan. 22, 2008, pp. 231-234.
Zimmer "New 'Hardware Platform' for 'GNSS Software Radios'— Conception of Combined GPS Galileo Receivers," Proceedings of GNSS 2003 Conference, Jun. 6, 2003, pp. 1-14.

* cited by examiner

*Primary Examiner* — Shuwang Liu
*Assistant Examiner* — David Huang
(74) *Attorney, Agent, or Firm* — Patent Capital Group

(57) ABSTRACT

A receiver architecture for processing spread spectrum signals. The receiver has an RF front end to receive and down convert a broadcast signal to an intermediate frequency carrier. The IF signal is digitized and provided to a processor (which may be a software-driven DSP, an ASIC or other embodiment) for processing. A given IF carrier is removed and the signal is low pass filtered. The signal is provided to a number of channels, each, for example, correspond to a unique transmitter. On each channel the sample rate is reduced to a predetermined fixed rate with timing mismatch compensated. The Doppler frequency shift, as estimated for the channel, is removed succeedingly. A locally generated copy of the spreading code used by the transmitter is applied to the carrier and Doppler removed signal at the predetermined fixed sample rate. The de-spread signal is used to provide estimates of the Doppler shift and for subsequent sample selection. Pseudo-range and delta pseudo-range estimates from each channel are used to estimate, for example, the receiver's position.

25 Claims, 14 Drawing Sheets

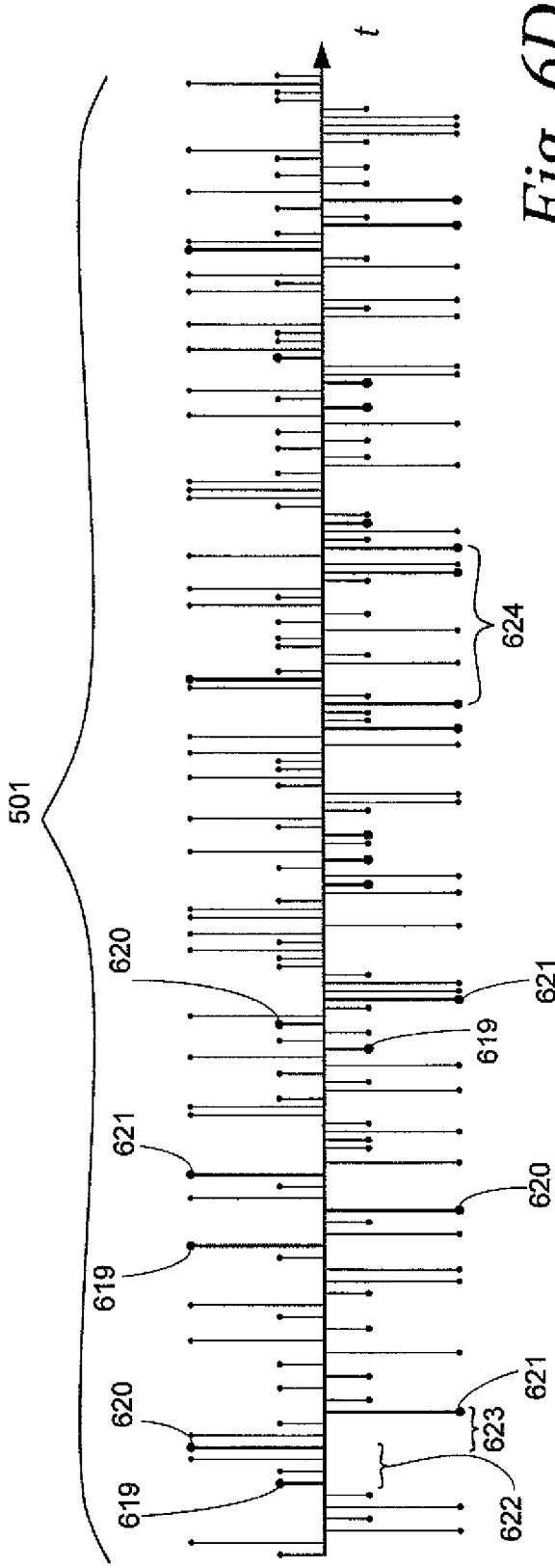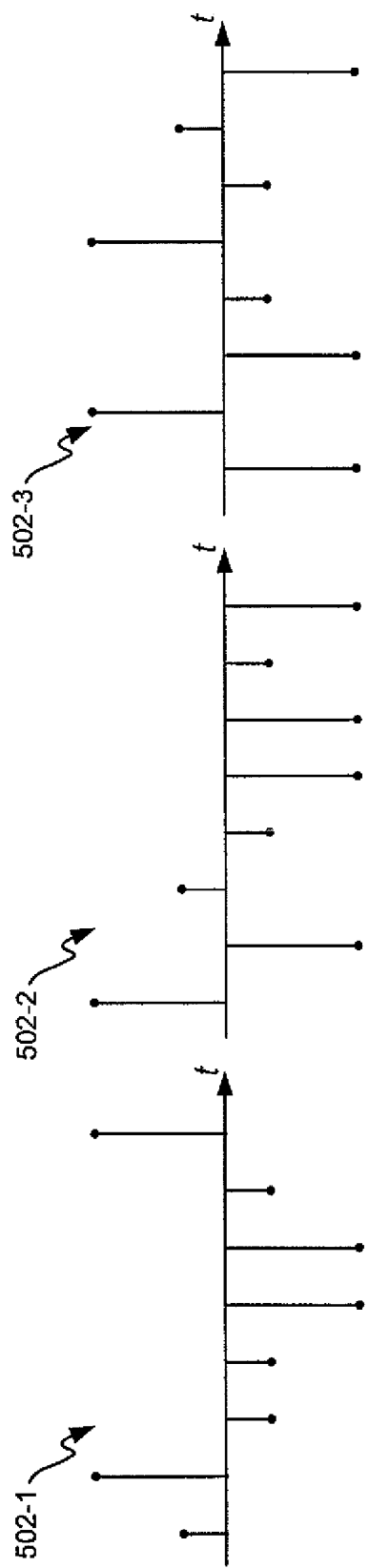

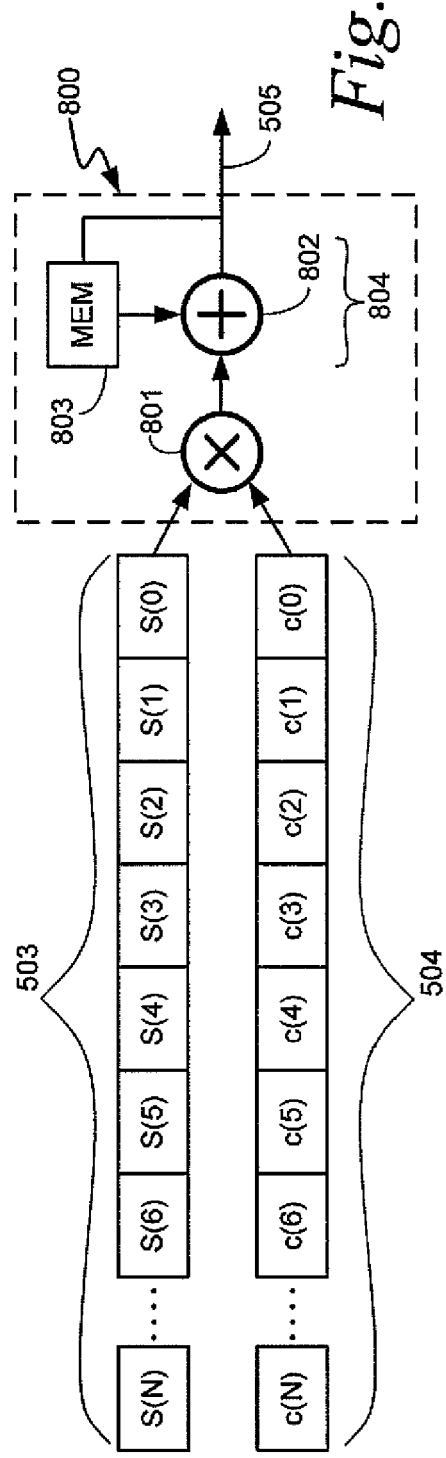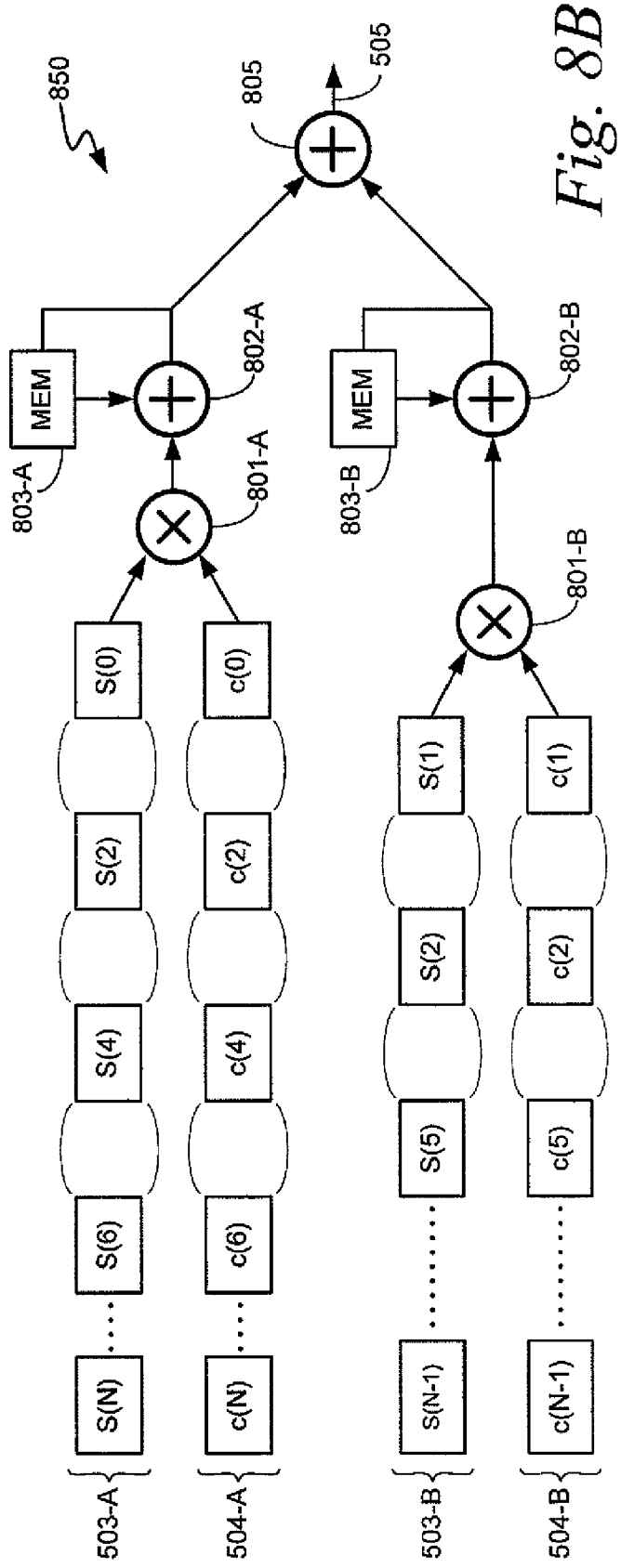
Fig. 8A
Fig. 8B

METHOD AND APPARATUS FOR SOFTWARE GPS RECEIVER

BACKGROUND

1. Field of the Invention

The invention relates generally to methods and apparatus for receiving, especially tracking of, direct-sequence spread spectrum (DSSS) signals such as GPS signals.

2. Description of Related Art

The Global Positioning System (GPS) is a global navigation satellite system (GNSS) that provides geo-spatial positioning with global coverage. GPS generally employs at least 24 satellites in six 20,200 km circular orbits. Four satellites operate in each plane. The orbits are arranged so that at least six satellites are always within line of sight from almost everywhere on Earth's surface.

GPS receivers use triangulation of the GPS satellites navigational signals to determine their location. The satellites provide at least two different signals that enable location determination with differing accuracies. Coarse-acquisition (C/A) code is intended for civilian use, and is deliberately degraded from the maximum accuracy known to be possible. By contrast, a precision (P) code is available primarily for governmental or military use. The P code may be encrypted by a "Y" code to produce a "P(Y)" code. Positional accuracy can be greatly improved with the use of augmentation system such as the Wide Area Augmentation System (WAAS) available in North America.

Each GPS satellite broadcasts a navigational message at 50 bits per second. The navigational messages are sent in 30-second frames. Each frame includes GPS time information, orbital information (i.e., "ephemeris data"), and an "almanac." The almanac contains coarse orbit and status information for every satellite, an ionospheric model, and information relating GPS time to coordinate universal time (UTC).

The navigational messages are transmitted using the C/A or P(Y) spread spectrum codes. FIG. 1 provides an overview of how the broadcast signal is generated on a satellite using direct-sequence spread spectrum (DSSS) modulation techniques. The example of C/A code is used. Initially the navigational signal 110 is multiplied by the C/A code 120. C/A code is a 1,023 "chip" pseudonoise code (i.e., spread spectrum code, spreading code) that is repeated every millisecond. The word "chip" is substituted for the usual parlance, "bit," to distinguish the pseudonoise code unit from information bits in the navigational signal 110. The "de-spread length" is the number of samples per repetition of a spreading code. The terms "chip rate" and "chips per second" may be similarly substituted when referring to a pseudonoise code (such as the C/A code). (With a certain interpretation of the numeric values of the symbols, the multiplication in the real domain may be equivalently performed by a modulo-two adder 140 in the binary domain, as shown in Table 1. The binary values 0 and 1 are mapped to real values 1 and −1, respectively. When the conditions are satisfied that a modulo-two addition of binary values is equivalent to a multiplication of corresponding real values, those terms are used interchangeably.)

TABLE 1

| Multiplication A × B = C | | | Mod 2 Adder $\text{mod}_2 (A + B) = C$ | | |
|---|---|---|---|---|---|
| A | B | C | A | B | C |
| 1 | 1 | 1 | 0 | 0 | 0 |
| 1 | −1 | −1 | 0 | 1 | 1 |

TABLE 1-continued

| Multiplication A × B = C | | | Mod 2 Adder $\text{mod}_2 (A + B) = C$ | | |
|---|---|---|---|---|---|
| A | B | C | A | B | C |
| −1 | 1 | −1 | 1 | 0 | 1 |
| −1 | −1 | 1 | 1 | 1 | 0 |

The resultant signal (on line 142) is a spread navigation message which is then modulated onto a carrier wave 130 by modulator 150. The global positioning system uses the L1 carrier frequency of 1,575.42 MHz or L2 carrier frequency of 1,227.6 MHz to modulate the spread navigation signal. The modulated signal 160 is broadcast by the satellite. Although each satellite broadcasts on the same carrier, the spread spectrum codes (e.g., C/A codes) are unique to each satellite. The specific spreading codes are chosen to have sufficiently small cross-correlation. By using distinct C/A codes, a receiver can distinguish each of the individual satellite's signals, despite use of the shared frequency band.

By the time the broadcast modulated signal reaches a GPS receiver, it may be significantly distorted. The relative velocity of the GPS receiver and a satellite may introduce large Doppler shifts. Transmission through the ionosphere may also introduce significant signal distortions.

FIG. 2 provides a block diagram of the architecture for a conventional GPS receiver 200. The GPS receiver 200 processes a signal in three phases: a radio frequency (RF) phase, 210, a digital processing phase 220, and an applications phase 230.

In the RF phase 210, the distorted broadcast signal from each of the satellites in view is received at antenna 211. The analog signal 241 (i.e., the received and applied signal is fed into an RF front end 212 which down converts the broadcast signal from the L1 or L2 carrier to an intermediate frequency (IF) carrier. The IF center frequency typically ranges from 2 MHz to more than 10 MHz depending on the RF front end design. Analog-to-digital converter (ADC) 213 digitizes the IF signal at a sampling rate, typically between 4 and 40 million samples per second (Ms/sec., where 1 Ms/sec.=1×10$^6$ samples/sec.). ADC 213 may quantize the samples to any number of bits, for example, 2 bits.

The digitized IF signal 242 output from the ADC 213 is initially processed. Often, this processing is performed by an application-specific integrated circuit (ASIC) 221 though other forms of processors may be employed, as well. The ASIC 221 implements a digital mixer and multi-channel de-spreader 222 to identify the navigation messages from each satellite. Initially the mixer removes the IF carrier and Doppler shift together using feedback provided from down stream components (i.e., tracking processors 223) and the IF signal becomes a baseband signal. Because each satellite's C/A code is known a priori, the navigational message for the satellite can be restored by de-spreading the baseband signal using a locally generated copy of the C/A code. The sampling rate of C/A must be adjusted dynamically due to the Doppler time effect on received signals. The multi-channel de-spreader 222 may process several channels simultaneously (e.g., up to 12). Each channel de-spreads the signal using a C/A code corresponding to a unique satellite.

The de-spread signals 243 from each channel are provided to corresponding tracking processors 223. De-spreading reduces the data rate down to about 50 to 1000 samples per second (s/sec.) per channel, and thus tracking processors 223 are typically implemented in software by a digital signal processor (DSP) or central processing unit (CPU) 225. The tracking processors 223 provide feedback at a similar bit rate (signal 244) to the digital mixer and multi-channel de-spreader 222. This feedback is used to remove the IF carrier and Doppler frequency as well as to synchronize the generation of the C/A code with the received signal against local clock error and Doppler shift in time.

The tracking processors 223 also output pseudo-ranges and delta pseudo ranges (signal 245) to a navigation program 224 at a rate of about 1 to 10 samples per second per channel. The navigation program 224 then estimates the receiver location from the ranges provided by each channel and the satellite location information received from each satellite.

In the application phase 230, the estimated location information may be sent (signal 246) to an application program or device 232 for additional processing and presentation. For example, application may display the estimated receiver location in the context of a map, or that location may be used to calculate a result (e.g., estimated time of arrival) or route to a destination.

FIG. 3 provides a detailed block diagram of the operation of the GPS receiver 200 in the digital processing phase 220 for an exemplary channel (there being one channel per satellite transmission being processed). Continuing the above example, processing above and below dashed line 330 may be performed in ASIC 221 and DSP 225, respectively.

Initially, the digitized IF signal 242 is delivered to channels 1 to N on paths 301-1 to 301-N, respectively. For each channel, ASIC 221 implements a mixer 310 for carrier and Doppler removal. Accurate removal of these components is made possible by a feedback signal 306 generated from processing down-stream.

With the carrier and Doppler frequencies removed, the navigational signal is retrieved by de-spreaders 311, 312, and 313. C/A code generator 314 provides the appropriate C/A code (respectively, code 303-1, 303-2 and 303-3) to the early, prompt, and late de-spreaders 311, 312, and 313, respectively. The C/A code 303-2 is time aligned with the incoming signal in the prompt de-spreader 312, while the C/A code 303-1 delivered to the early de-spreader 311 and the C/A code 303-3 delivered to the late de-spreader 313 are time-shifted ahead and behind code 303-2, respectively. The time alignment against clock mismatch and Doppler shift is controlled by the code numerically controlled oscillator (code NCO) 316. The C/A codes generated by the C/A code generator 314 are provided to the de-spreaders at the sample rate as high as that of the IF signal which may be significantly higher than the C/A code bit rate of 1.023 Mbps. The C/A code generator 314 must generate the C/A code "on the fly" to match the varying C/A chip duration due to clock error and Doppler shift in time. Generating C/A code on the fly is controlled by the code NCO 316.

The outputs of the de-spreaders are passed to the code tracking processor 321 and, in the case of the output of prompt de-spreader 312 also to the carrier tracking processor 322, implemented in the DSP 225.

The code tracking processor 321 uses a delay-locked loop (DLL) algorithm to measure the time mismatching between broadcast from the GPS satellite and reception by the GPS receiver, and feed the measurement back to the code NCO 316.

The carrier tracking processor 322 uses a phase-locked loop/frequency-locked loop (PLL/FLL) algorithm to measure the frequency mismatching of the satellite signal. The measured frequency shift is fed back to the carrier NCO 315 at 305. The carrier NCO 315 provides a feedback signal 306 to mixer 310 for both carrier and Doppler removal.

The code tracking processor 321 and carrier tracking processor 322 output pseudo-ranges and delta pseudo-ranges to the navigation program 224. Delta pseudo-range is the change in pseudo-range over a specified time interval and is equal to the time rate of change of actual range adjusted for clock errors. It is equivalent to the measured Doppler shift in the carrier frequency of the received signal. This information in combination with the output signals 340 from the remaining channels are used to calculate the GPS receiver position.

Conventional GPS systems have been implemented either fully in ASIC hardware or in ASIC accelerators combined with DSP/CPU processors. Hardware accelerators have been essential to meeting the high computational requirements of known GPS decoding techniques. However, development costs associated with ASICs are considerably greater than for software and ASIC solutions lack the flexibility to adjust themselves to meet changing performance requirements. Moreover, new GNSS such as Galileo and newly added GPS signals require a re-design of ASIC chips. Thus, a need exists for a full software GPS solution and consequently a GPS decoding technique with lower computational requirements.

SUMMARY

A new receiver architecture favoring software or low-power hardware implementation for processing spread spectrum signals is disclosed. In common to conventional approach, the receiver has an RF front end to receive and down convert a broadcast signal to an IF carrier, and an A/D converter to digitized the IF signal. The processing afterwards adopts a new procedure and architecture that enable software or ultra-low power hardware implementations. Instead of combined IF and Doppler frequencies removal, the IF carrier is removed solely and a baseband low pass filter is applied. The resulted signal is provided to a number of channels, each, for example, corresponding to a unique (satellite) transmitter. On each channel, the signal is immediately down-sampled to a predetermined fixed rate such as the chip rate of the spreading code. At the same time, the clock error and Doppler time shift is compensated. Then the residual Doppler frequency shift, as estimated for the channel, is removed from the signal at the low data rate. A locally generated copy of the spreading code used by the transmitter is applied to the resulted signal at the predetermined sample rate and with fixed number of samples per code length. The de-spread signal is used to perform estimation of residual mismatching in time and frequency and provide information for the next round of tracking operation. Pseudo-range and delta pseudo-range estimates from each channel are also computed and are used to estimate, for example, the receiver's position.

In some aspects, the invention relates to a method of operating a receiver which synchronizes to a plurality of Direct-Sequence Spread Spectrum (DSSS) sources and receives a plurality of radio frequency (RF) signals conveyed at a substantially uniform carrier frequency as a superposition of individually Doppler-shifted signals due to a relative motion of each DSSS source and the receiver, each RF signal encoded with message data using a spreading code unique to its respective DSSS source. The method comprising acts of, with an analog-to-digital converter, generating a sequence of digitized samples from an intermediate frequency (IF) signal down-converted from the received superposition; removing an intermediate carrier frequency from and subsequently low pass filtering the sequence of digitized samples to produce a combined quasi-baseband signal; and subsequent to and separately from producing a combined quasi-baseband signal, downsampling, synchronizing in time to and removing individually a residual frequency shift from the combined quasi-baseband signal to produce a baseband signal for each DSSS source.

In another aspect, the invention relates to a receiver comprising a front end, an analog-to-digital converter, and a microprocessor. The front end is configured to receive and down convert a broadcast radio frequency (RF) signal carrying message data. The analog-to-digital converter is configured to digitize the down converted broadcast RF signal and output a digitized intermediate frequency (IF) signal. The microprocessor is configured to perform acts defined by each of a plurality of modules, each module comprising instructions executable by the microprocessor. The plurality of modules including a spreading code generator, a carrier removal module, a baseband low pass filter, a carrier numerically controlled oscillator (NCO) module, a sample load module, a Doppler removal module, a Doppler NCO module, and a processing module. The spreading code generator is configured to output a spreading code at a first sample rate. The carrier removal module is configured to remove an IF carrier from the digitized IF signal and output a quasi-baseband spread spectrum signal at a second sample rate. The low pass filter filters the output of the carrier removal module. The carrier NCO module generates IF harmonic waves for carrier removal. The sample load module is configured to down-sample the low pass filtered quasi-baseband spread spectrum signal to the first sample rate, and output a fixed-rate down-sampled signal. The Doppler removal module is configured to remove the residual frequency shift from the fixed-rate down-sampled signal and output a Doppler removed signal. The Doppler NCO module is configured to generate harmonic waves for Doppler removal. The processing module is configured to track the Doppler removed signal and obtain said message data at least by de-spreading the Doppler removed signal with the spreading code.

In another aspect, the invention relates to a receiver comprising a front end, an analog-to-digital converter, and a processor. The front end is configured to receive and down convert a broadcast RF signal carrying message data. The analog-to-digital converter is configured to digitize the down converted broadcast signal and output a digitized IF signal. The processor is configured to perform functions defined by each of a plurality of modules. The plurality of modules including a spreading code generator, a carrier removal module a baseband low pass filter, a carrier numerically controlled oscillator (NCO) module, a sample load module, a Doppler removal module, a Doppler NCO module, and a processing module. The spreading code generator is configured to output a spreading code at a first sample rate. The carrier removal module is configured to remove an IF carrier from the digitized IF signal and output a quasi-baseband spread spectrum signal at a second sample rate. The low pass filter filters the output of the carrier removal module. The carrier numerically NCO module is configured to generate IF harmonic waves for carrier removal. The sample load module is configured to down-sample the low pass filtered quasi-baseband spread spectrum signal to the first sample rate, and output a fixed-rate down-sampled signal. The Doppler removal module configured to remove the residual frequency shift from the fixed-rate down-sampled signal and output a Doppler removed signal. The Doppler NCO module is configured to generate harmonic waves for Doppler removal. The processing module is configured to track the Doppler removed signal and obtain said message data at least by de-spreading the Doppler removed signal with the spreading code.

In yet another aspect, the invention relates to a computer-readable storage medium storing computer-executable modules, each module including computer-executable instructions that, when executed, perform a function. The modules include a carrier removal module, a spreading code module, a sample load module, and a processing module. The carrier removal module is configured to remove a carrier from an input signal, at least in part by multiplying the input signal by the carrier signal, and output a spread spectrum signal. The spreading code module comprises instructions configured to output a spreading code at a first sample rate. The sample load module comprises instructions configured to down-sample the spread spectrum signal received at a second sample rate, to the first sample rate, and output a fixed-rate down-sampled signal. The processing module comprises instructions configured to obtain a message signal at least by de-spreading the fixed-rate down-sampled signal with the spreading code.

BRIEF DESCRIPTION OF DRAWINGS

The invention and embodiments thereof will be better understood when the following detailed description is read in conjunction with the accompanying drawing figures. In the figures, elements are not necessarily drawn to scale. In general, like elements appearing in multiple figures are identified by a like reference designation. In the drawings:

FIG. 6D is an example of a sample stream provided to the sample load module;

FIG. 6E-G are examples of early, prompt, and late sample streams output from the sample load module;

FIG. 8A is a block diagram of a de-spreader according to some embodiments;

FIG. 8B is a block diagram of a paralyzed de-spreader according to some embodiments;

DETAILED DESCRIPTION

Central processing units (CPUs) and their "cousins," digital signal processors (DSPs), have an incredible versatility to implement algorithms and methods provided through software commands. As compared to a dedicated hardware implementation, of a signal processing function, software to implement equivalent functionality often may be developed more quickly and with considerably less expense. As well, software is revised at much lower expense and at a much lower capital investment, and usually more quickly. However, dedicated hardware often is used when a CPU or DSP simply cannot be operated fast enough to perform a desired function in a set time.

GPS receivers have conventionally been designed to use both dedicated hardware (e.g., one or more application-specific integrated circuits, or ASICs) and a DSP for executing software, ASICs generally being used to implement algorithms that required very high data rates.

A receiver architecture is presented that eliminates the need for an ASIC in the digital processing phase, and enables the receiver processing to be completely implemented in software executed by a DSP (or CPU). Alternatively, the architecture may be implemented partially in hardware to achieve ultra-low power solution. The receiver architecture may be used to perform processing for a direct-sequence spread spectrum (DSSS) receiver. For example, DSSS is used for many classes of global navigation satellite system (GNSS) receivers (e.g., GPS, M-code GNSS, Galileo).

Receiver Architecture

Figure 4:
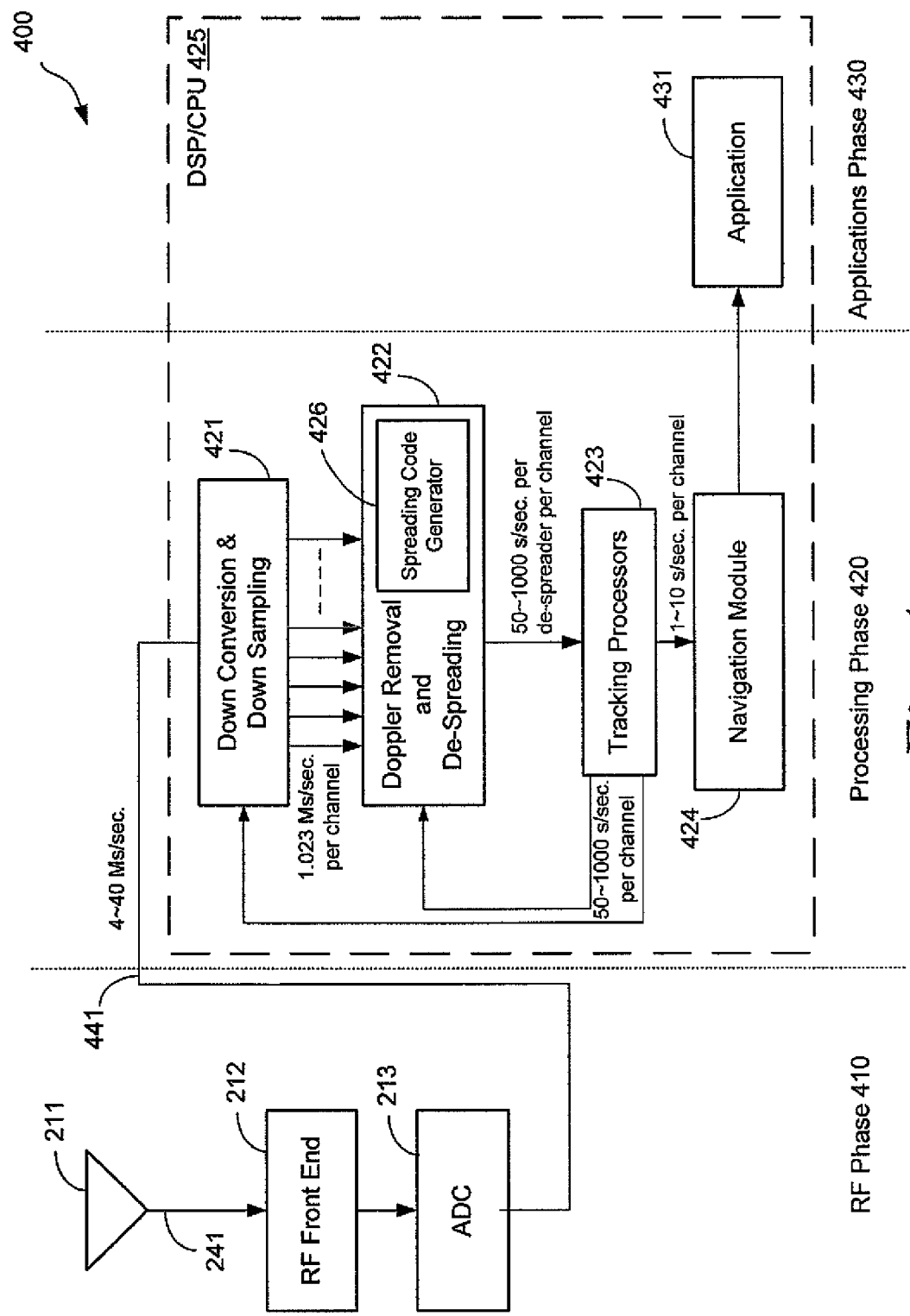
FIG. 4 is a block diagram of a receiver according to some embodiments.

An overview of an example receiver 400 of this type is shown in FIG. 4. Some signal lines of receiver 400 are labeled with example sample rates. These numbers are provided simply as an illustrative example. Embodiments may use any suitable sample rates.

Figure 2:
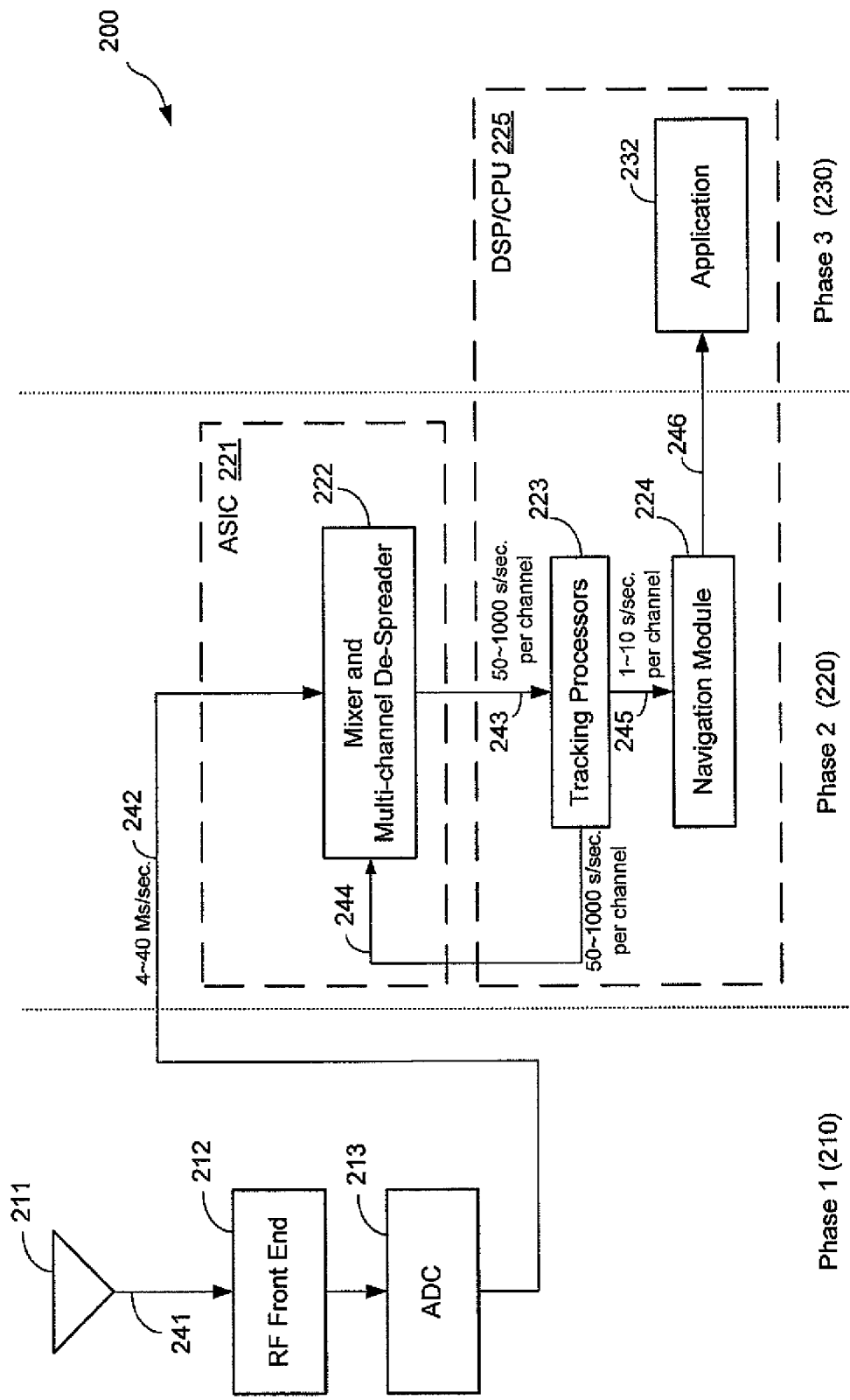
FIG. 2 is a block diagram of a prior art receiver.
Figure 3:
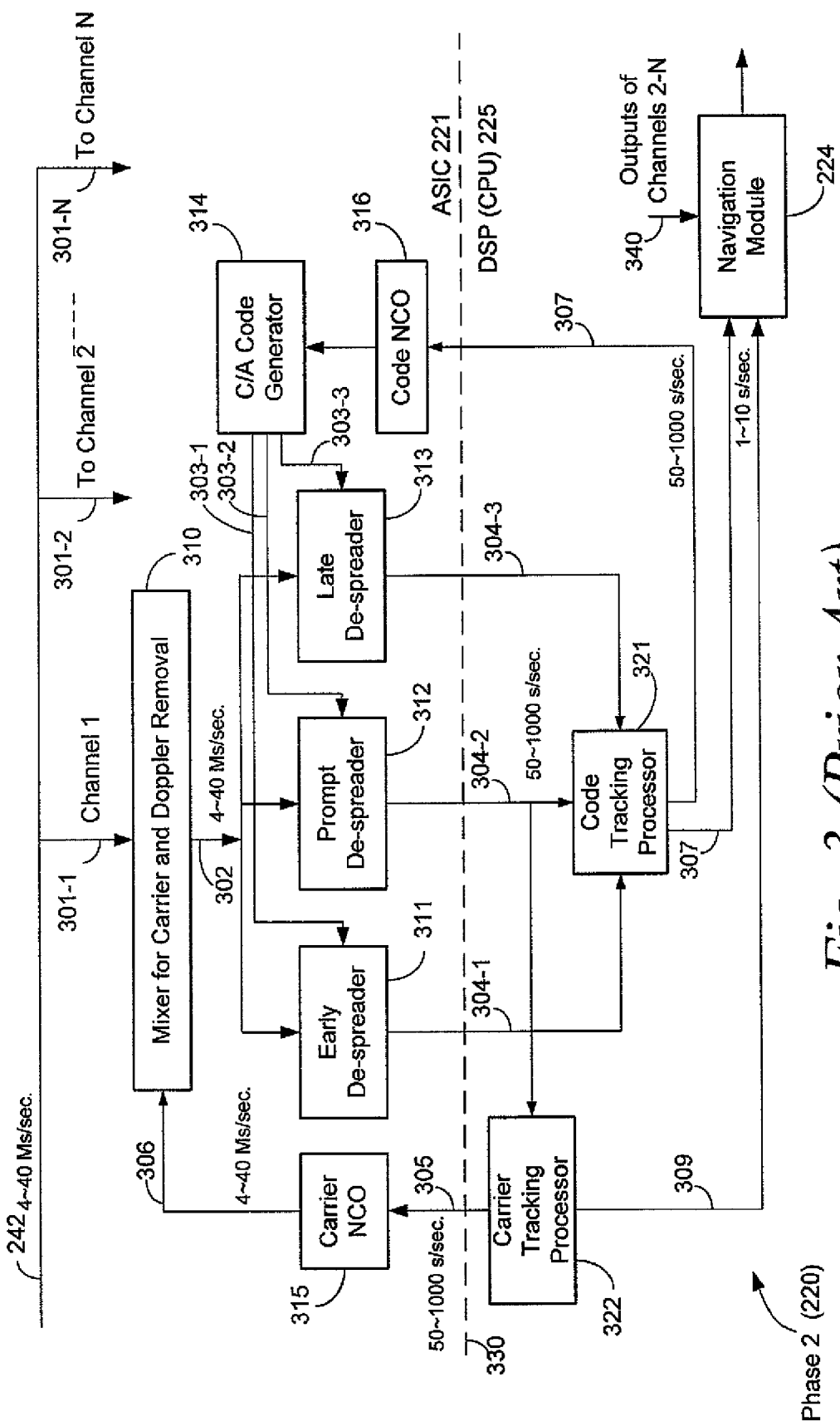
FIG. 3 is a block diagram of the digital processing phase of the prior art receiver.

Like the GPS receiver 200 in FIG. 2, the architecture of receiver 400 may be viewed as being divided into three stages or phases: an RF phase 410, a digital processing phase 420, and an applications phase 430.

The RF phase 410 of receiver 400 may perform similarly to the RF phase 210 of the GPS receiver 200 in FIG. 2. Initially, the broadcast signals from various transmitters are received by antenna 211. The received analog signal 241 is fed from the antenna 211 into an RF front end 212 which may down convert the broadcast signal from the carrier frequency to an intermediate frequency (IF) (e.g., using an analog mixer). For a consumer GPS receiver, the carrier frequency may be the L1 carrier at 1,575.42 MHz, for example. Depending on the RF front end design, the IF center frequency may range from about 1 MHz to more than 10 MHz. If down conversion is not performed, the subsequent references to the IF carrier and IF signal should be interpreted as referring to the original signal.

Analog-to-digital converter (ADC) 213 digitizes the IF signal at a sampling rate, typically between 4 and 40 million samples per second (Ms/sec.). ADC 213 may quantize the samples to any number of bits, for example, two bits.

Output from the RF phase 410 is a digitized IF signal 441 with a bit rate typically between 4 and 40 Ms/sec. This signal is delivered to a DSP 425 (or CPU) which has a number of modules (e.g., software modules) for further processing the IF signal.

Initially in the digital processing phase 420, the IF signal 441 is delivered to a down conversion and down sampling module 421. Down conversion eliminates the known IF carrier from the IF signal 441. The down conversion process includes a baseband low pass filter to mitigate high frequency imaging and noise in order to avoid aliasing in the later down sampling on each channel. Although the baseband low pass filter is for low complexity designed to filter a baseband signal with zero center frequency, the mismatch from the quasi-baseband signal causes a trivial loss in system performance, as has been proved by simulation.

The down converted signal may be delivered to a number of channels for further processing. Each channel may correspond to a unique transmission source (e.g., a GPS satellite broadcast). On each channel, the digital signal may be down sampled to a commonly predetermined sample rate. The predetermined sample rate may match the chip rate of a spreading code. For example, in a GPS receiver, the signal may be down sampled to the C/A code chip rate, 1.023 Ms/sec. The down sampling process may be controlled by feedback from tracking processor module 423 in order to compensate the time mismatching caused by clock error and Doppler time shift. In some embodiments, on each channel multiple versions of the down sampled signal may be produced. A predetermined relationship may exist between the selected samples for each down sampled signal. For example, a first version of the down sampled signal may be composed of samples m samples before or after the samples of a second version of the down sampled signal.

The down sampled signals for each channel are fed into a Doppler removal and de-spreading module 422. On each channel the residual carrier and Doppler frequencies are removed from the down sampled signals using a feedback signal from the tracking processor module 423. The tracking processor module 423 provides for each channel an estimate of the frequency mismatching where the effect of Doppler dominates. On each channel, Doppler removal may be performed for each version of the down sampled signal.

The Doppler removed low-rate signals are de-spread using the spreading code for the channel. Each channel may have a suitable spreading code pre-generated by the spreading code generator 426 at the predetermined sample rate (e.g., 1.023 Ms/sec.). In some embodiments, the spreading code generator 426 is shared among the channels, but provides each channel with it's appropriate code. The spreading code may be generated ahead of time, saved, and loaded as necessary. For example, a look-up table in memory may be used for storing the code. If multiple versions of the down sampled signal are produced for a channel, the same spreading code is applied to each. In some embodiments, the multiple versions of the down sampled signal include an early, prompt, and late signal. In GPS receivers, for example, each channel de-spreads the down sampled signals using a C/A code corresponding to a satellite whose broadcast signal is being received. Each channel may use a C/A code that corresponds to a unique satellite source. Each channel therefore recovers a unique broadcast signal. The de-spreading process reduces the sample rate to about 50 to 1000 samples per second for C/A code.

After applying the spreading code, the de-spread signals are provided to the tracking processor module 423. The tracking processors provide feedback to the down conversion and down sampling module 421 and the Doppler removal and de-spreading module 422.

In the carrier removal operation, the nominal carrier is known and removed although the frequency is defined in the scope of local clock. The residual carrier frequency due to clock error is counted into the Doppler shift which is handled by Doppler removal. The Doppler shift is generally unknown a priori and feedback is used to adjust or "track" the Doppler and residual carrier removal operation.

The tracking processors also provide pseudo-ranges and delta pseudo-ranges to the navigation module 424. For example, a consumer GPS receiver may provide pseudo-ranges and delta-pseudo ranges to the navigation module 424 at a sample rate of 1 to 10 samples per second per channel.

The navigation module 424 may estimate navigational properties of the receiver. In some embodiments, any of position, speed, heading, and the like may be estimated by the navigation module 424, from the received GPS signals.

In the applications phase 430 an application 431 may use the receiver position for any suitable purpose. For example, the application 431 may provide a receiver location on a navigational map or calculate a route based on a current position and heading.

Figure 5:
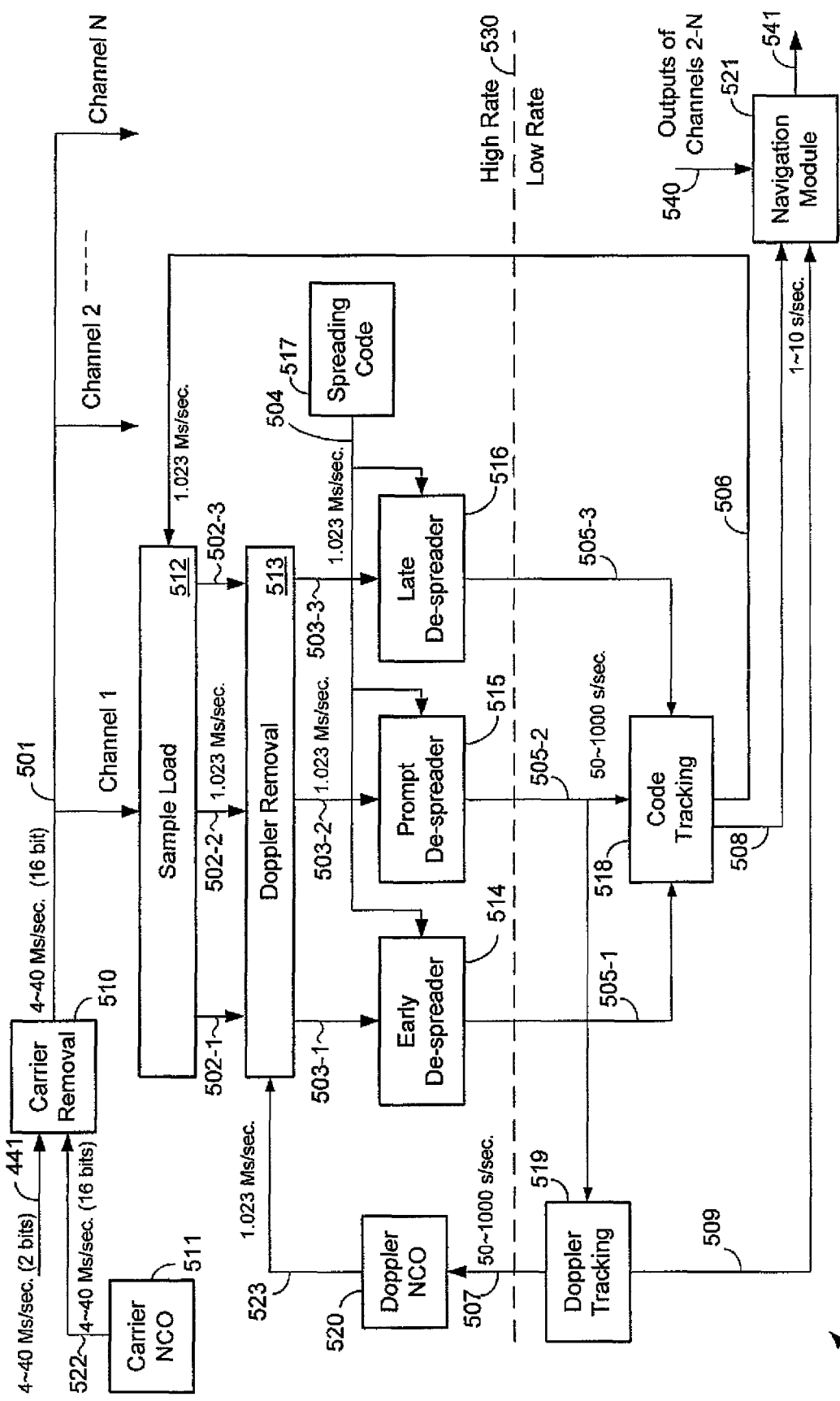
FIG. 5 is a block diagram of the digital processing phase of the receiver according to some embodiments.

FIG. 5 provides a block diagram of the digital processing phase 420 for channel 1 of the receiver 400. Each of channels 2 to N may be implemented similarly. In some embodiments, all modules in the digital processing phase 420 are implemented using a DSP or CPU.

Many of the signal paths are labeled with example sample rates. Example numbers for the bits per sample may also be provided. For example, the IF signal 441 is labeled as having a sample rate of 4 to 40 Ms/sec. and each sample is quantized to 2 bits. These numbers are illustrative, and a specific embodiment may use any suitable sample rate and number of bits per sample which may be above, below, or outside of the example values and ranges provided here.

Initially in the digital processing phase 420, the IF carrier is removed from IF signal 441 by carrier removal module 510. The carrier removal module receives an IF reference signal 522 from the carrier NCO module 511. The IF reference signal 522 is used to remove the IF carrier frequency from the IF signal 441 by the carrier removal module 510. A high frequency image of the IF signal may be produced as an artifact of the digital mixer in carrier removal. A baseband low pass filter may be implemented as part of the carrier removal module 510 to eliminate the high frequency image as well as noise that may otherwise significantly damage the carrier removed signal via high frequency aliasing in the subsequent down sampling operation. The carrier removal module outputs a "quasi-baseband" signal 501 which may still have a Doppler shift and a small residual portion of the carrier frequency.

It should be appreciated that carrier removal with baseband low pass filtering is to be performed within engineering tolerances. That is, the receiver maintains stability despite the Doppler frequency and a small residual portion of the carrier frequency that may be present due, for example, to clock errors. Accordingly, and as is well understood in the relevant arts, "removal" of a carrier frequency means the removal of a pre-determined carrier frequency with respect to the local clock, allowing for residual presence of energy at the center frequency. Because the Doppler shift, which may be as much as 20 kHz, represents only a small portion of the signal bandwidth (e.g., 2 MHz double-side bandwidth for C/A code), performance losses due to the residual frequencies may trivially affect the performance of the receiver.

Figure 6A:
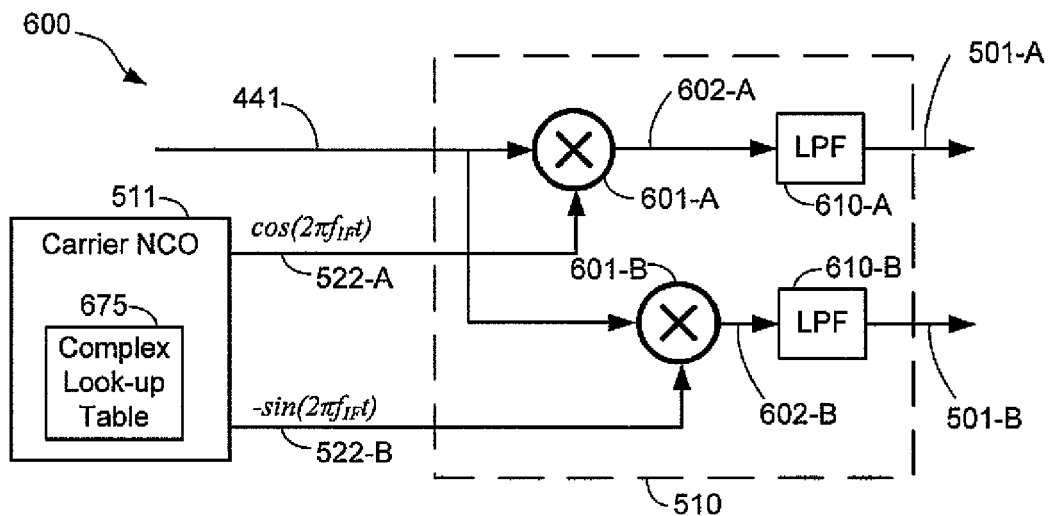
FIG. 6A is a block diagram of a carrier removal module of the receiver according to some embodiments.
Figure 6B:
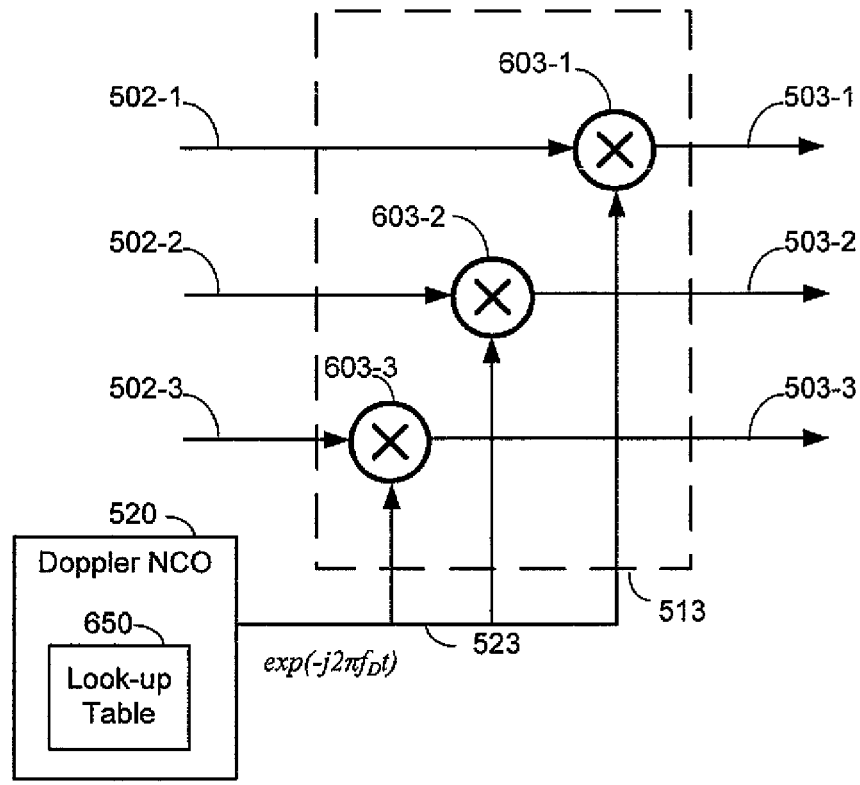
FIG. 6B is a block diagram of a carrier removal module of the receiver according to some embodiments.

Example embodiments of the carrier removal module 510 and carrier NCO module 511 are shown in FIGS. 6A and 6B. In embodiment 600, carrier NCO module 511 outputs signals 522-A and 522-B. Signals 522-A and 522-B may be, for example, sinusoidal waves at the IF center frequency, $f_{IF}$. One signal may be a quarter period out of phase with the other. For example, output signals 522-A and 522-B may be written as $\cos(2\pi f_{IF} t)$ and $-\sin(2\pi f_{IF} t)$, respectively. Here, the time variable, t, is taken as a series of discrete sample times.

Figure 6C:
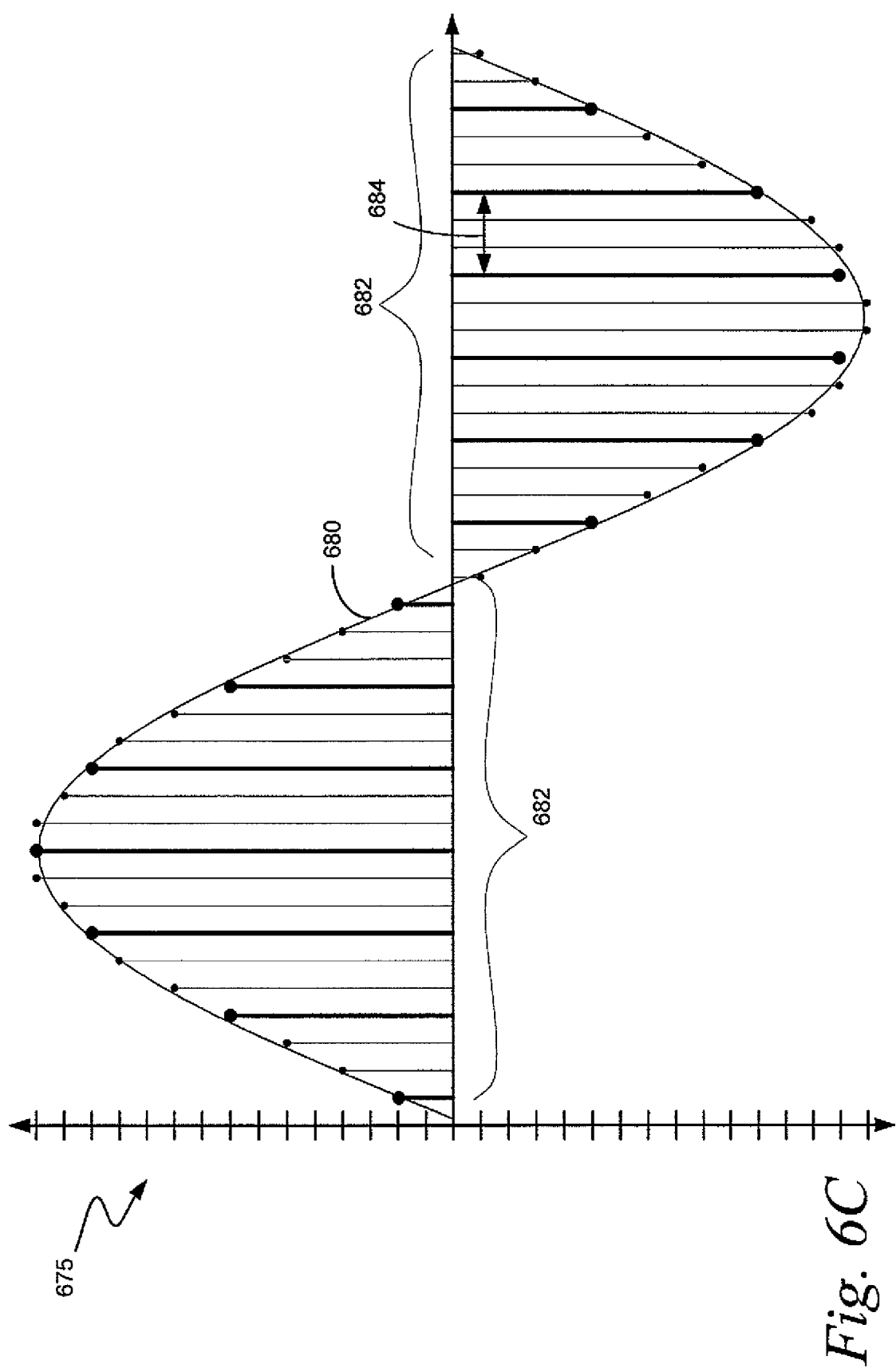
FIG. 6C is an illustration of a sinusoidal wave stored in a look-up table for use by a numerically controlled oscillator.

In some embodiments, carrier NCO module 511 utilizes a look-up table 675. The look-up table 675 may have data for a single cycle of a sinusoid. An illustrative representation of the contents of an example look-up table 675 is shown in FIG. 6C, where each dot on the sinusoid represents a sample whose value would be stored in the look-up table, indexed against the corresponding time, t. Look-up table 675 may have a number of samples 682 that discretely quantize a sine wave 680. The stride 684, defined as the spacing of samples read and output from the carrier NCO when a look-up table is used, along with the rate at which samples are written to the carrier NCO output determines the output frequency. In the example, the stride 684 is three samples; however, the stride may be adjusted dynamically, or in a predetermined way. Any suitable stride may be used.

In the embodiment 600, the output signals 522-A and 522-B are used by carrier removal module 510 to remove the IF carrier from the real-value IF input signal 441. Specifically, mixers 601-A and 601-B (i.e., software multiplication operations) may be used to multiply the output signals from the carrier NCO module by the IF input signal 441. The outputs 602-A and 602-B of mixers 601-A and 601-B, respectively, are input to (software) low pass filters (LPF) 610-A and 610-B as shown. The low passed signals 501-A and 501-B are then delivered to each of channels 1-N. Signals 501-A and 501-B can be combined to form a complex-value signal.

Figure 7A:
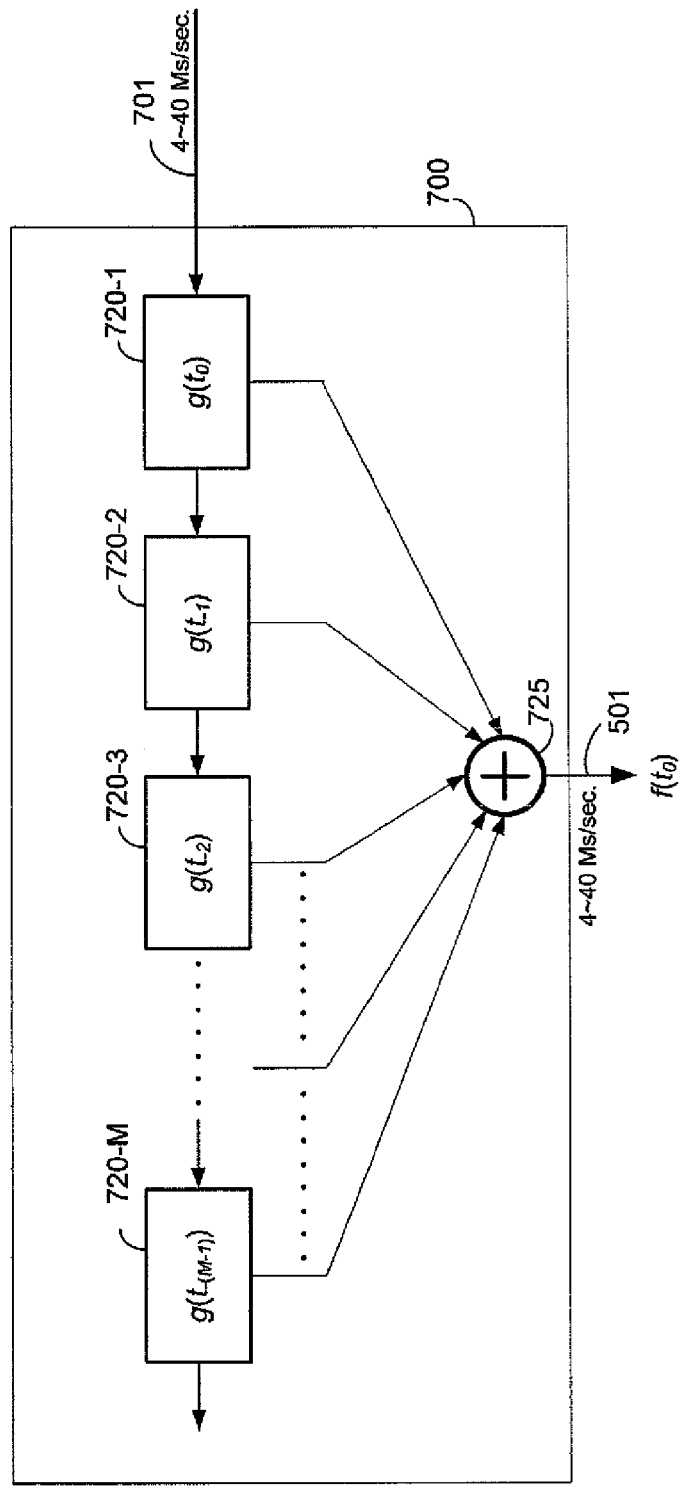
FIG. 7A is a block diagram of a boxcar filter according to some embodiments.

The low pass filters 610-A, and 610-B may be implemented in any suitable way. For example, there are many known algorithms for low pass filtering, and software coding for them. FIG. 7A illustrate an example embodiment of the low pass filter as a simple M-tap boxcar filter 700. In some embodiments, the boxcar filter has a number of filter taps equal to the integer part of the ratio of the over-sampling rate of the IF signal 441 with respect to the chip rate. It has been verified by simulation for a GPS signal that the boxcar filter is sufficient for the low-pass filtering purpose.

The boxcar filter 700 receives the carrier removed signal 701 (e.g., signal 602, 602-A, or 602-B). At time $t_0$, the signal 701, $g(t_0)$, output from a mixer, enters memory unit 720-1. The previous samples, $g(t_{-(M-1)}), \ldots, g(t_{-1})$, are shifted to memory units 720-M, ..., 720-2, respectively. Samples prior to time $t_{-(M-1)}$ may be discarded. Adder 725 sums the samples, $g(t_{-(M-1)}), \ldots g(t_0)$ stored in memories 720-1 to 720-M and outputs the sum, $f(t_0)$. The low passed carrier removed signal 501 at time $t_0$, $f(t_0)$, relies only on the previous M samples. Formally, the filter output signal 501 at time $t_0$, $f(t_0)$, may be written as:

$$f(t_0) = \sum_{m=0}^{M-1} g(t_{-m})$$

In some embodiments, the filtered signal may be averaged (e.g., by dividing by M) or otherwise scaled.

Figure 7B:
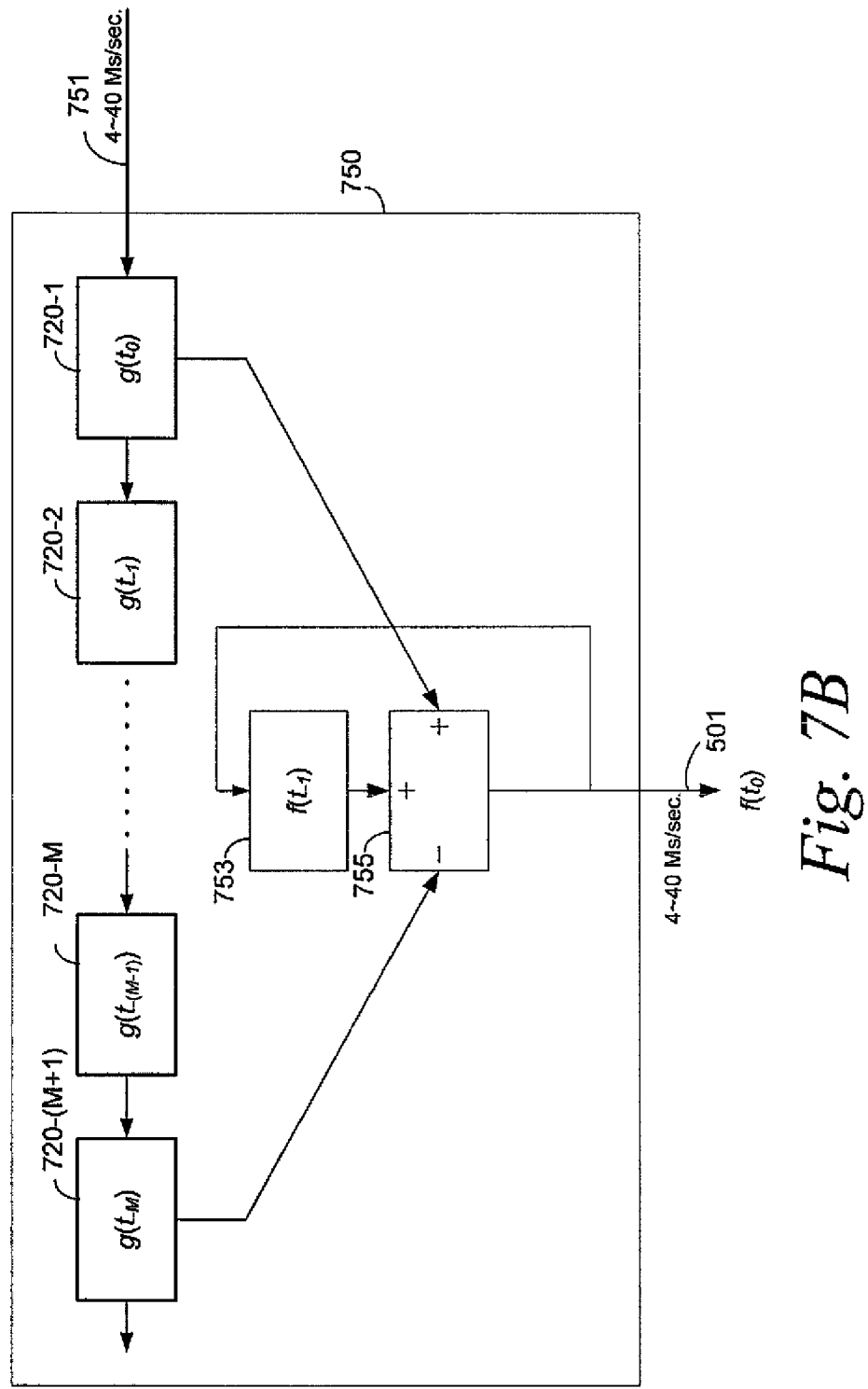
FIG. 7B is a block diagram of a boxcar filter according to some embodiments.

FIG. 7B illustrates another example embodiment, boxcar filter 750, which receives the carrier removed signal 751 (e.g., signal 602, 602-A, or 602-B). The boxcar filter 750 has memory units 720-1, ..., 720-(M+1). Boxcar filter 750 has the memory 720-(M+1) to store one more sample, $g(t_{-M})$, than the boxcar filter 700. An additional memory 753 saves the last (i.e., previous) filter output, $f(t_{-1})$. The boxcar filter 750 requires an adder/subtractor 755 to perform only one addition and one subtraction per sample time to produce the filter output signal 501. The computation performed, $f(t_0)=f(t_{-1})-g(t_{-M})+g(t_0)$, in adder/subtractor 755 yields an identical result to that of the boxcar filter 700.

Figure 7C:
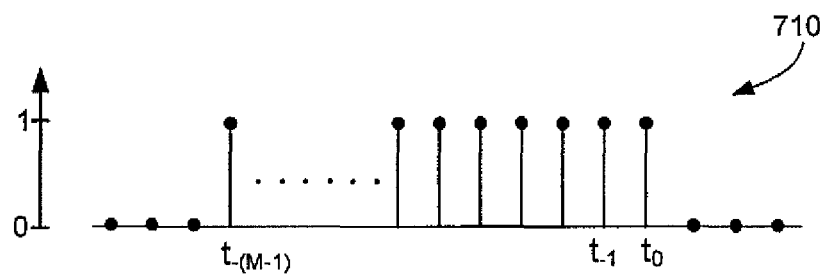
FIG. 7C is an illustration of the discrete time domain view of a boxcar filter according to some embodiments.

Plot 710 in FIG. 7C shows a sketch of the time domain representation of the M tap boxcar filter. The filter may be viewed as a discrete rectangular function to be convolved with the carrier removed signal, g(t).

Figure 7D:
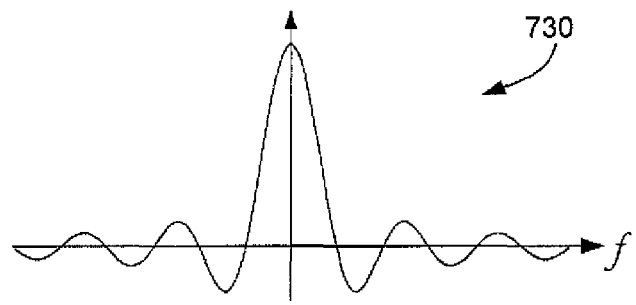
FIG. 7D is a graph of the frequency spectrum of a boxcar filter according to some embodiments.

Plot 730 in FIG. 7D shows a sketch of the frequency domain representation of the boxcar filter assuming a sufficiently high sample rate and number of filter taps (to minimize aliasing). The frequency domain representation illustrates the expected low pass behavior.

The pair of samples output from the carrier NCO module 511, that is the signals 501-A and 501-B of embodiment 600 or equivalently the complex signal 501 are treated as one sample. In some embodiments this is a sixteen-bit sample (e.g., 8-bits real part and 8-bits imaginary part), although any suitable sample size may be used consistent with performance requirements. The signal 501 is provided to channels 1-N. In some embodiments, the signals are provided to each channel through a shared sample load module 512. In some other embodiments, the signals are provided on each channel to respective sample load modules 512.

The sample load module 512 reduces the sample rate of the filtered signal 501 down to a fixed rate and applies timing compensation in accordance with a channel specific feedback signal 506. In some embodiments, sample load module 512 selects samples in strides controlled by the feedback signal 506 from the code tracking processor 518. Stride, refers to the spacing, in samples, between selected samples. For example, if every tenth sample is selected the stride is ten. The configurable stride is continuously adjusted to compensate the time mismatching caused by delays and Doppler time shift.

The sample rate of each signal output from the sample load module may equal the chip rate of the spreading code. For example, C/A code uses a chip rate of 1.023 Ms/sec. If, for example, the data rate of the delivered signal 501 is 20 Ms/sec., to achieve a desired sample rate of 1.023 Ms/sec., the sample load module 512 must select, on average, about one in every 20 samples.

The sample load module may produce any number of reduced sample rate outputs. In the embodiment shown in FIG. 5, three sample streams are output from the sample load module: the early sample stream 502-1, prompt sample stream 502-2, and late sample stream 502-3. The early sample stream 502-1 may be related to the prompt data stream 502-2 in a predetermined way. For example, the early sample stream 502-1 may correspond to samples in the signal 501 m samples before the samples in the prompt sample stream 502-2, and the late sample stream 502-3 may correspond to samples in the signal 501 n samples after the samples in the prompt sample stream 502-2. In some embodiments, m and/or n are fixed. In some embodiments m and/or n may be configurable. In yet some other embodiments, m and n may always have the same value (i.e., m=n). The number of samples between the sample streams may, for example, be a value stored in memory that may be adjusted dynamically by any suitable embodiment of receiver 400.

FIG. 6D provides an illustrative example of signal 501. Here the signal 501 is assumed to be a 2-bit (four state) real signal (arbitrary sample values are chosen for illustration). The signal has a series of samples (represented by ball-ended lines) that are delivered at equal time intervals. For illustrative purposes the spacing of the first several samples is shown larger than the later samples. In the illustration, the early samples 619 are selected three samples prior to the prompt samples 620 (m=3), and the late samples 621 are three samples after the prompt samples 620 (n=3). Each of the early, prompt, and late samples has been emphasized for clarity. The early, prompt, and late sample streams each use the same stride 624 between sequential samples that is determined through feedback from the code tracking module 518. The stride has been chosen for the illustration as about 19 or 20 samples.

FIGS. 6E, 6F, and 6G show the resulting early, prompt, and late sample streams 502-1, 502-2, and 502-3, respectively.

In some embodiments, the early and late sample streams may be approximately half a chip (i.e., half of the time for which a chip is broadcast) ahead and behind the prompt sample stream, respectively. For example, if the sample rate of the signal 501 is 20 Ms/sec. and the chip rate is $1.023 \times 10^6$ chips per second, there are about 10 samples per half chip ($[20 \times 10^6 / 1.023 \times 10^6]/2 \approx 10$). Thus, in this example, the early sample stream samples would be taken 10 samples before the prompt sample stream, and the late sample stream would be taken 10 samples after the prompt sample stream. Various tradeoffs may exist in selecting the delay between the early prompt and late sample streams. A smaller spacing may reduce the effects of multipath for example.

The Doppler removal module 513 removes the Doppler shift from the data streams. As illustrated in FIG. 5 the Doppler shift may be removed from the early, prompt, and late sample streams 502-1, 502-2, and 502-3. Doppler may be removed by multiplying the sample streams by a complex wave generated by the Doppler NCO module 520. The complex wave may have a cosine real part and a sine imaginary part. The Doppler NCO module 520 may be controlled by feedback signal 507 received from the Doppler Tracking processor 519. The Doppler NCO module 520 may output a sinusoidal signal at the Doppler frequency to the Doppler removal module 513. The Doppler frequency may correspond to the Doppler shift experienced by the carrier wave. The Doppler NCO module 520 may utilize a look-up table to generate the feedback signal 520. Because of the relatively low frequency of Doppler shift, the look-up table can choose much higher resolution than the carrier NCO module 511 and consequently improve tracking precision significantly than conventional solution where carrier and Doppler frequencies are removed together.

FIG. 6B, shows an embodiment of the Doppler NCO module 520 that outputs a complex signal 523. Doppler NCO module 520 may read the complex signal 523 from a complex look-up table 650. Complex signal 523 may be in the form $\exp(-j2\pi f_D t)$, where j is the imaginary unit, $\sqrt{-1}$, t is the time, and $f_D$ is the estimated Doppler frequency. The output signals 502-1, 502-2, and 502-3 are multiplied with the complex signal 523 by mixers 603-1, 603-2, and 603-3, respectively, to produce outputs 503-1, 503-2, and 503-3, respectively. The outputs 503-1, 503-2, and 503-3 are provided to the de-spreaders as shown in FIG. 5.

The Doppler removal module 513 may individually multiply the data streams by the complex wave provided by the Doppler NCO. The data stream and complex wave may each have, for example, 16-bit fixed point samples. Multiplication may be performed on the samples to output, for example, 32-bit fixed point samples.

Here Doppler "removal" is both substantial and sufficient for operation of the receiver. The term "removal" is used in this sense. The residual Doppler shift, after removal, is monitored by the subsequently described Doppler tracking module 519.

The Doppler removed sample streams are passed to corresponding de-spreader modules. For example, early, prompt, and late sample streams are delivered to the early, prompt, and late de-spreader modules 514, 515, and 516, respectively. The de-spreader modules also receive a spreading code signal 504 generated by the spreading code module 517. The sample rate of the spreading code provided to the de-spreaders may be the same as the fixed sample rate of the sample streams since the Doppler time effect and local clock error have been compensated in the sample load module. Because the time shifting of the early and late data streams is also performed at the sample load module 512, the same spreading code signal 504 may be delivered to each de-spreader.

For a GPS receiver utilizing the C/A code, the sample rate of both the sample stream and C/A code signal may be 1.023 Ms/sec., corresponding to the chip rate of a C/A code broadcast by GPS satellites.

The spreading code signal 504 may be pre-generated and saved in memory (e.g., in a look-up table). For example, the spreading code may be a 1,023 chip C/A code, unique to each transmitter that repeats itself every one-thousandth of a second.

The de-spreaders 514-516 may multiply the spreading signal and the respective sample streams from the Doppler removal module 513. For example, the C/A code may be a 1 bit signal, where the states represent the numeric values +1 and −1. In that case, the de-spreader may simply change the sign of the data stream accordingly to effect multiplication.

FIG. 8A provides a block diagram of a de-spreader module 800 (e.g., de-spreader 514, 515, or 516) according to some embodiments. The sample stream 503 and spreading code 504 are multiplied, term-by-term, by multiplier 801 (e.g., S(0)×c(0)). The term-by-term products are then summed by an accumulator 804 over the course of one or more repetitions of the spreading code. Accumulator 804 may have an adder 802 and memory 803. The output 505, also written as $O_{505}$, is provided at the end of an accumulation period (e.g., after a predetermined number of repetitions of the spreading code):

$$O_{505} = \sum_{n=0}^{N} S(n) \times c(n)$$

The output 505 (FIG. 8A), corresponds to the outputs 505-1, -2 and -3 of de-spreaders 514, 515, and 516, respectively, in FIG. 5. Initially and at the end of accumulation, memory 803 may be reset to zero.

Figure 1:
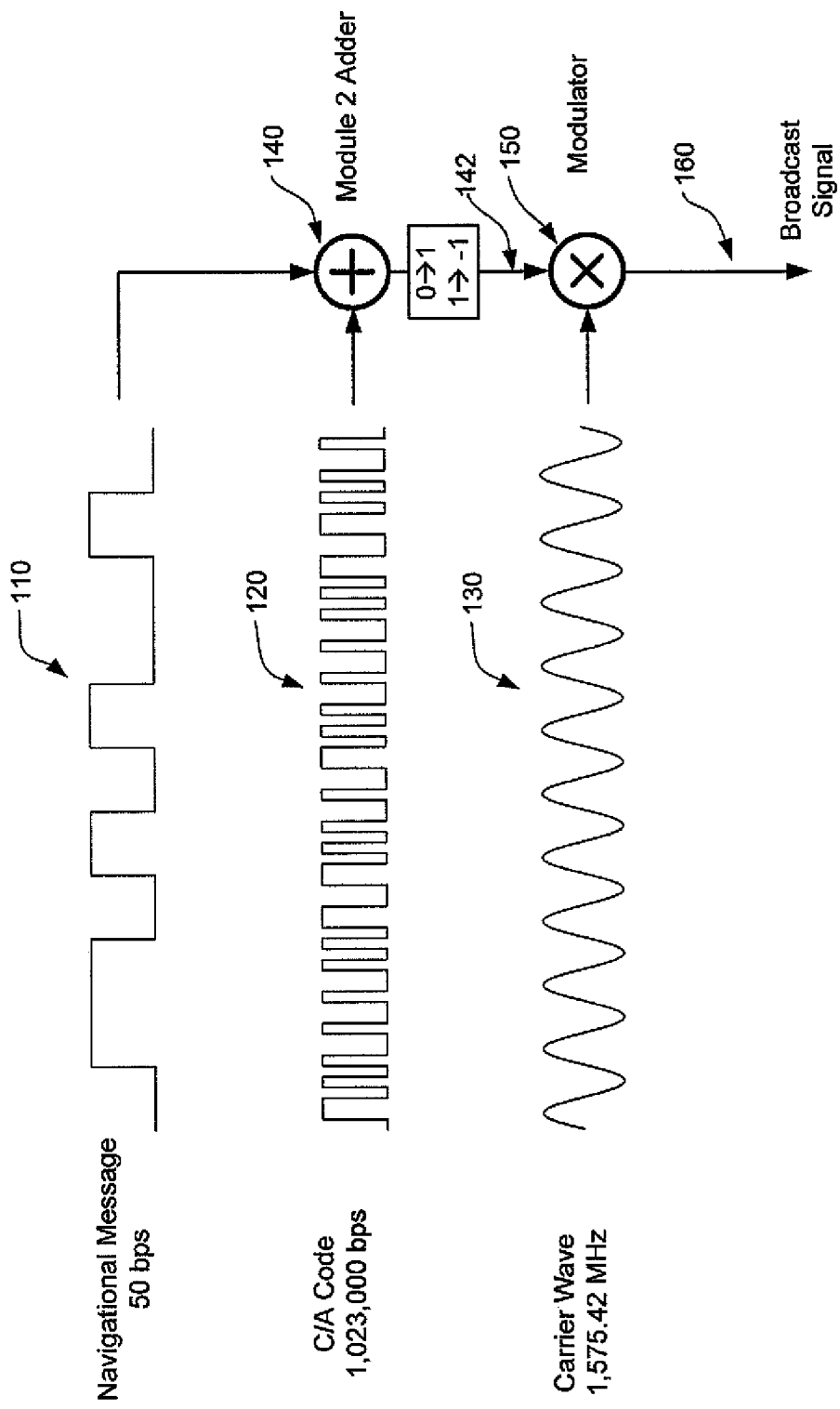
FIG. 1 is an illustration of direct-sequence spread spectrum modulation, with specific reference to a GPS transmitter.

In some embodiments, the sample rate output from the accumulator is greater than or equal to the bit rate of the navigational message 110 (see FIG. 1).

The number of repetitions to be summed may be determined a priori, or may be adapted to changing receiver conditions. The accumulator may output samples with any suitable sample size and numeric encoding system. For example, a 32-bit fixed point number, a floating point number, or any other suitable numeric encoding system and sample size may be used.

Because the de-spreading length is predetermined and fixed in some embodiments, a de-spreader 850 may be designed to have multiple parallelized paths as shown in FIG. 8B. The de-spread length may be a predetermined number of samples per repetition of the spreading code. For example, the de-spread length may be greater than or equal to the number of chips per repetition of the spreading code. De-spreader 850 exploits the fixed de-spread length by using two or more parallel "paths" for processing the sample stream. In the example embodiment, two paths are shown, path "A" and path "B". The A and B paths may each receive alternating sample pairs. For example, the sample stream is alternately divided into sample streams 503-A and 503-B delivered to paths A and B, respectively. Similarly, the spreading code is alternately divided into spreading code 504-A and 504-B delivered to paths A and B, respectively. (The presumption that N is even is simply illustrative.) Multipliers 801-A and 801-B operate as multiplier 801, above, as do the accumulator components, adders 802-A, 802B and memories 803-A and 803-B. An additional adder 805 reconstructs the sums of all the paths. Output 505 is thus identical using either de-spreader 800 or de-spreader 850.

De-spreader 850 may be adapted to support in general, M parallel paths, for example, by delivering samples aM+m from both the sample stream and the spreading code to the mth path (a=0, 1 . . . ). Generally, any suitable method for dividing the sample among the paths may be used.

De-spreader 850 may be implemented, for example as a hardware accelerator. Such an accelerator may be designed to use considerably less power than a hardware accelerator implementing de-spreader 800, for example, because the operational frequency may be reduced by up to a factor of M (i.e., the number of paths). at a lower frequency, the rise and fall times become less critical and the power supply voltage may be reduced. This, in turn, may lead to a significant reduction in power consumption. Parallelization may be applied in other suitable ways to the receiver design (e.g., in various other modules where operations are performed at constant rate and length).

The de-spread signals (e.g., signals 505-1, 505-2, and 505-3), are passed to the code tracking module 518. The code tracking module 518 may use any suitable algorithm to determine the stride for the sample load and provide a feedback signal 506 to the sample load module 512. For example, a delay-locked loop (DLL) algorithm may be used.

The signal output from at least one de-spreader (e.g., signal 505-2 from the prompt de-spreader 515) may be passed to the Doppler tracking module 519. The Doppler tracking module 519 estimates the residual Doppler shift and provides a feedback signal 507 to the Doppler NCO 520 which generates a complex wave for Doppler removal by the Doppler removal module 513. Any suitable algorithm may be used by the Doppler tracking module 519, such as the phase-locked loop and/or frequency-locked loop (PLL/FLL) algorithms, to measure the Doppler shift of the signal.

The algorithms implemented by the code tracking module 518 and Doppler tracking module 519 may also generate pseudo-ranges and delta pseudo ranges. This range data may be provided to the navigational module 521 by the code tracking module 518 and the Doppler tracking module 519 by signals 508 and 509, respectively. The navigational module 521 receives similar signals 540 from the remaining channels (e.g., channels 2-N).

Navigational information signal 541 may be provided to an application 431 for use with that particular application.

Method 900

Figure 9:
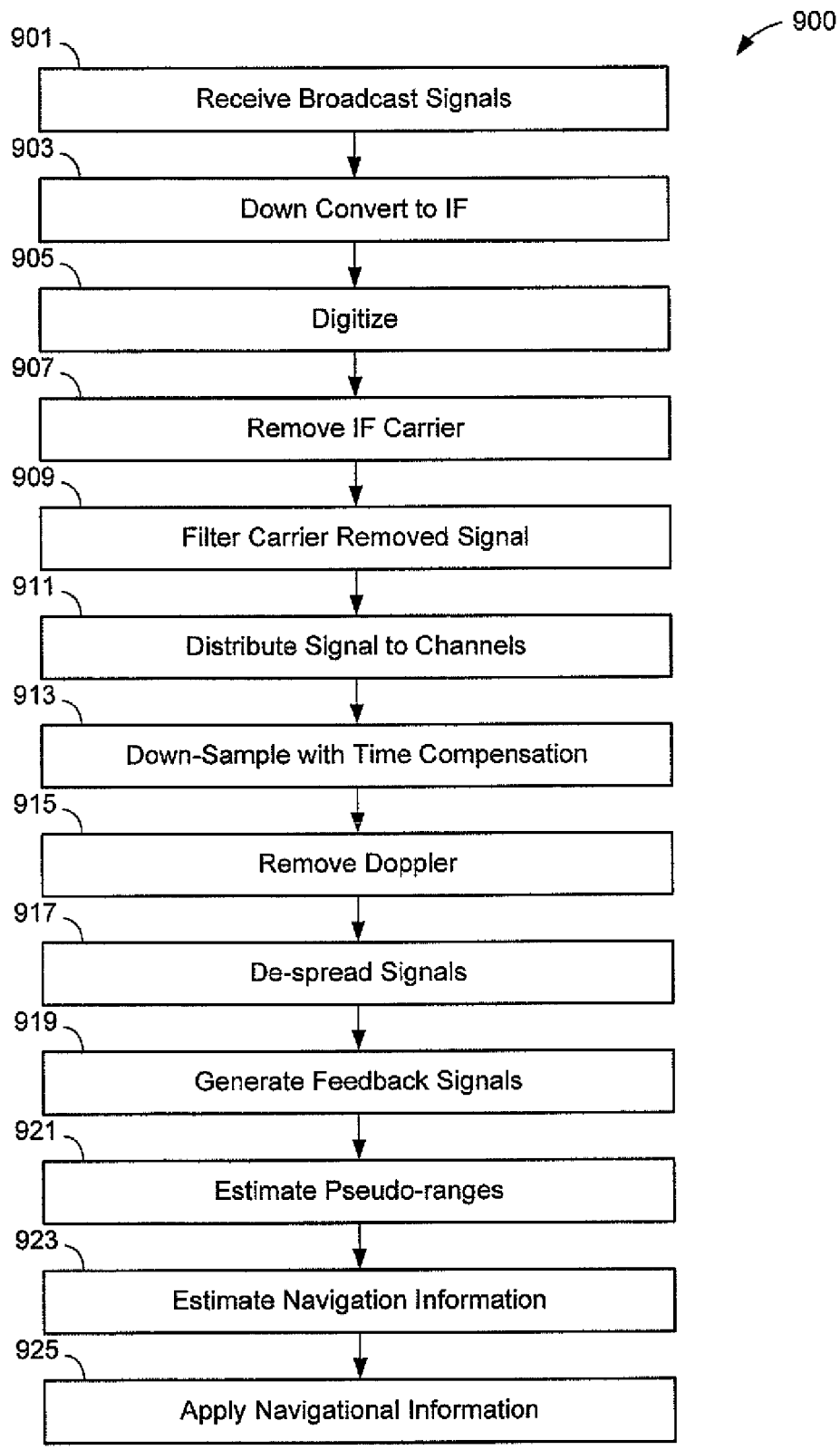
FIG. 9 is a method of operating a receiver according to some embodiments.

A method 900 of operating a receiver is presented in FIG. 9.

In step 901 a broadcast signal is received. Any suitable radio frequency (RF) front end may be used. The broadcast signal may be a combination of signals broadcast from several transmitters. The broadcast signal may be a signal modulated at a carrier frequency. For example, the signal may be modulated to the L1 band carrier frequency of 1575.42 MHz.

In step 903, the signal is down converted to an intermediate frequency (IF). In some embodiments, steps 901 and 903 may be performed, for example, by RF front end 212 (FIG. 4).

In step 905, the signal is digitized. Any suitable means of analog to digital conversion may be used. For example, ADC 213 may be used (FIG. 4).

In step 907, the IF carrier is removed from the signal. The IF carrier may be removed from the signal by a digital mixer and an IF carrier signal provided, for example, by carrier NCO 510 (FIG. 5). The carrier may be removed by carrier NCO 511. Example embodiments 600 and 650 for carrier removal module 511, shown in FIGS. 6A and 6B, respectively, may be used.

In step 909, the signal may be low passed filtered. For low complexity, the low pass filter may be designed for baseband signals with zero center frequency. The baseband low pass filter be a boxcar filter. In some embodiments, the boxcar filter has a number of filter taps equal to the integer part of the over-sampling rate of the IF signal. In some embodiments, low pass filtering may be performed by the carrier removal module 510 (FIG. 5). The low pass filter may be a boxcar filter such as boxcar filters 700 and 750 as shown in FIGS. 7A and 7B, respectively.

In step 911, the signal is distributed to a number of processing channels. For example, twelve channels may be used. Each channel may correspond to a unique transmitter that the broadcast signal was generated by.

Steps 913 to 921 may be performed for each channel. For example, these steps may be performed in parallel on each channel.

In step 913, the sample rate of the signal is reduced and the timing mismatch is compensated. In some embodiments, the sample rate is reduced by selecting a subset of the samples. The subset of the samples may be determined by channel feedback provided through a code tracking module. The code tracking module may determine the stride between samples to compensate time mismatching. The code tracking module may use a delay-locked loop (DLL) algorithm to determine the stride between samples. For example, samples may be selected by sample load module 512 under the control of the code tracking module 518 (FIG. 5).

In some embodiments, multiple sets of samples are selected at the reduced sample rate. Each of these sets of samples may constitute a distinct down sampled signal. The samples of these sets may have a predetermined relationship. In some embodiments, three sample streams (e.g., early, prompt, and late) are output. Each stream may defined by a predetermined sample spacing with respect to another stream.

In step 915, a Doppler frequency shift is removed from each of the reduced sample rate signals. The Doppler frequency may be specific to each channel, for example, when each channel corresponds to a different transmitter moving at different velocities relative to the receiver. A Doppler frequency signal, generated by a Doppler NCO, may be used to remove the Doppler frequency from the signals, for example, as shown in FIG. 6B. The frequency of the Doppler NCO may be controlled by a Doppler tracking module. The Doppler tracking module may implement a phase-locked loop/frequency-locked loop tracking algorithm to process data and estimate the Doppler shift.

For example, the Doppler removal module 513 may remove the Doppler shift from the reduced sample rate signals by using a signal received from Doppler NCO 520, controlled by the Doppler tracking module 519 (FIG. 5). After Doppler removal, each signal stream may now have both carrier and Doppler frequency components removed.

In step 917, each signal is de-spread using a spreading code specific to the channel. For example, GPS satellite transmitters encode a navigational message 110 using a C/A code 120 specific to that transmitter (FIG. 1). The specific C/A code is known and used by the corresponding channel to de-spread the carrier and Doppler removed signals and thus recovers the navigational message.

In step 919, the de-spread signals (e.g., de-spread early, prompt, and late signals) are used to generate the feedback signals needed to adjust the stride for sample rate reduction and for Doppler time shift compensation. A DLL algorithm may be applied to the de-spread signals to control sample selection. A PLL/FLL algorithm may be used to estimate the Doppler shift and control the Doppler NCO. In some embodiments, the PLL/FLL algorithm is applied to one de-spread signal (e.g., the prompt de-spread signal) to estimate the Doppler shift.

In step 921, the pseudo-ranges and delta-pseudo ranges are estimated. The pseudo-ranges and delta-pseudo ranges may be estimated by the DLL algorithm and the PLL/FLL algorithm.

In step 923, the pseudo-ranges and delta-pseudo ranges from all the channels are used to estimate navigation information. Estimated navigation information may, for example, include any of position, speed, acceleration, heading, altitude, coordinate location, and the like.

In step 925, the navigation information is used for some purpose. The navigational information may be applied to any suitable purpose. For example, the navigational information may be used to present a location on a map, to calculate a driving route, or to navigate a vehicle.

Further Embodiments

Figure 10:
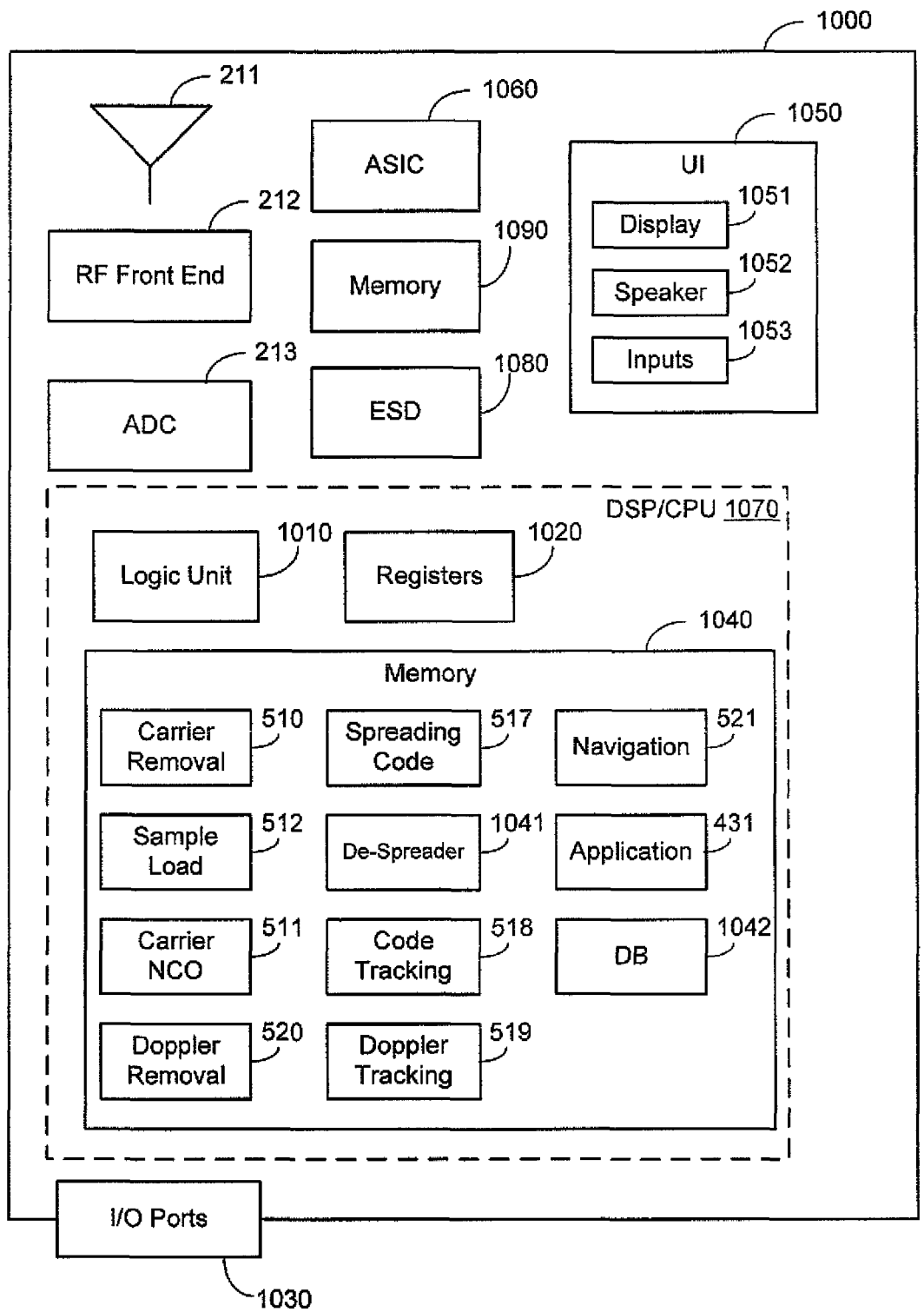
FIG. 10 is a receiver according to some embodiments.

FIG. 10 provides example embodiment 1000 of a receiver. Receiver 1000 may be used for receiving and processing GNSS signals (e.g., GPS).

The receiver 1000 may have an antenna 211, RF front end, 212, and ADC 213 as were described with reference to receiver 400 (FIG. 4).

The receiver 1000 may also have a microprocessor 1070 with a logic unit 1010. Microprocessor 1070 may be any suitable processing device such as, for example and not limitation, a CPU, DSP, controller, addressable controller, general or special purpose microprocessor, microcontroller, addressable microprocessor, programmable processor, programmable controller, dedicated processor, dedicated controller, or any other suitable processing device. In some embodiments, registers 1020 are present to store, for example, information about a configuration of microprocessor 1070. In some embodiments, receiver 1000 has memories 1040 and 1090. Memory 1040 may be integrated into microprocessor 1070, while memory 1090 may include "off-chip" memory that may be accessible to microprocessor 1070.

Memories 1040 and 1090 may store software modules that when executed by logic unit 1010 perform a desired function. Memory 1040 and memory 1080 may be any suitable type of computer-readable storage medium such as, for example and not limitation, RAM, a nanotechnology-based memory, one or more floppy discs, compact discs, optical discs, volatile and non-volatile memory devices, magnetic tapes, flash memories, hard disk drive, circuit configurations in Field Programmable Gate Arrays, or other semiconductor devices, or other tangible computer storage medium. In this example, modules are shown in memory 1040, however, this is purely illustrative and modules may be stored on either memory (or both).

Memory 1040 may store, for example, a carrier removal module 510, a sample load module 512, a carrier NCO module 511, a Doppler NCO module 520, a Doppler removal module 513, a spreading code module 517, a code tracking module 518, a Doppler tracking module 519, a navigation module 521, and an application module 431. Each of these modules when executed may perform the function described with respect to the like reference numbered blocks of the receiver 400 (see FIG. 4-5). Memory 1040 may have a de-spreader module 1041.

In some embodiments, each channel utilizes the same software modules (e.g., sample load module 512) independently, such that only one copy of the module need be stored in memory. For example, multiple instances of de-spreader module 1041 may be used to perform, for each channel, the functions of early de-spreader module 514, prompt de-spreader module 515, and late de-spreader module 516. Thus, for example, if 12 channels were being simultaneously processed, a total of 36 instances of the de-spreader module may be running, while only one copy of de-spreader module 1041 need be stored in memory. In some embodiments, microprocessor 1070 supports multiple threads (multi-threading) such that each receiver channel may be simultaneously processed.

Memory 1040 (or memory 1090) may also store a database 1042. Database 1042 may store information for the application module 431. For example, database 1042 may have street information that an application 431 may use to determine a route to a destination.

Multiple applications may be stored in memory 1040 and/or memory 1070. In some embodiments, a user may select an application to be executed.

In some embodiments, receiver 1000 has an energy storage device 1080 to power the receiver 1000. ESD 1080 may be a battery, a capacitor, a fuel cell, a power supply operating off of a.c. mains or any other suitable device for powering receiver 1000. In some embodiments receiver 1000 may receive power from an external power source.

The receiver 1000 may have one or more user interface (UI) 1050. UI 1050 may have inputs 1054 for receiving user commands (e.g., keypad, microphone). UI 1050 may also include a display 1051, and speaker 1052 to provide outputs to the user.

The receiver 1000 may also have an application-specific integrated circuits (ASICs) 1060. In some embodiments, ASIC 1060 provides a ultra-low power hardware implementation of one or more of the modules used in the digital processing phase 420 (FIG. 5). For example, carrier removal module 510 may be implemented as hardware through ASIC 1060.

Receiver 1000 may be used to receive GNSS signals, determine navigational properties and use the properties as an input to an application. Additionally receiver 1000 may support other functionality. For example, receiver 1000 may support cellular telephony, text messaging, internet browsing, personal management software, broadcast digital video reception (e.g., digital video broadcast (DVB), DVB-handheld (DVB-H)).

Receiver 1000 may be integrated into other devices. For example, receiver 1000 may be integrated into a cellular phone, a digital camera, a personal digital assistant (PDA), an automobile, or any other mobile device or machine. Various enhancements may be made by the combination of receiver 1000 with such devices. For example, a cellular phone user may transmit his or her location to another user to enable the users to determine a place to meet. In a digital camera, for example, when an image is captured, the location information could be stored with the image.

The modules of the receiver's processing architecture may be implemented by one or more appropriately configured processors implemented in any suitable way. The term processor is used to refer to logic machines for executing computer programs, hardware such as ASICs, or any suitable combination thereof. For example, a given module may be embodied as one or more logic machines such as a microprocessor, a CPU, DSP, or system-on-a-chip (SOC) executing one or more computer programs to provide the desired functionality. Alternatively, they may also be implemented in hardware, for example, as a hardware accelerator or ASIC. In some embodiments, both hardware and software processing are used.

Some embodiments have been described in the context of the global positioning system, however, the techniques may be applied to other global navigation satellite systems. Some embodiments have been described in the context of the consumer GPS receivers utilizing C/A code signals in the L1 band at the frequency of 1575.42 MHz, however, the architecture may be applied to any suitable receiver. For example, the techniques may be applied to a receiver operable to decode P(Y) code.

Look up tables may be implemented in memory, caches, registers, or any other suitable location or storage device.

Some embodiments may support augmentation systems such as the wide area augmentation system (WAAS). Some embodiments may support the global navigation satellite system "Galileo" currently being built by the European Union (EU) and European Space Agency (ESA). Some embodiments may support the next-generation GPS or "GPS III".

The terms digital signal processor (DSP) and central processing unit (CPU) are used synominously throughout the text to refer to any logic machine for executing computer programs and include, but are not limited to machines embodied as one or more single or multiple core microprocessors.

Any suitable numerical representation system may be used to represent values in the receiver. For example, fixed point numbers and floating point numbers may be used. In some embodiments, modules may use different numeric representation systems for inputs and outputs.

Modules may be operably connected in any suitable way. A first module operably connected to a second module is configured to provide an output (e.g., signal, data) to the second module. The second module operably connected to the first is configured to receive the output. The output may be provided from the first module to the second through an intermediary. For example, the output may be stored to a memory which is read by the second module. The intermediary may manipulate the output. For example, the output may be passed through a filter.

Having thus described at least one illustrative embodiment of the invention, various alterations, modifications, and improvements will readily occur to those skilled in the art. Such alterations, modifications, and improvements are intended to be within the scope of the invention. Accordingly, the foregoing description is by way of example only and is not intended as limiting. The invention is limited only as defined in the following claims and the equivalents thereto.

What is claimed is:

1. A method of operating a receiver which synchronizes to a plurality of Direct-Sequence Spread Spectrum (DSSS) sources and receives a plurality of radio frequency (RF) signals conveyed at a substantially uniform carrier frequency as a superposition of individually Doppler-shifted signals due to a relative motion of each DSSS source and the receiver, each RF signal encoded with message data using a spreading code unique to its respective DSSS source, the method comprising acts of:

(a) removing an intermediate carrier frequency from and subsequently low pass filtering a sequence of digitized samples to produce a filtered combined quasi-baseband signal;

(b) reducing the sample rate of the filtered combined quasi-baseband signal down to a fixed rate equal to a chip rate of the spreading code and removing a variable Doppler time shift in the filtered combined quasi-base band signal in a single step by dynamically adjusting a sample stride of a down-sampler; and (c) removing a Doppler frequency shift from the fixed-rate signal to produce a baseband signal for each DSSS source.

2. The method of claim 1, wherein the low pass filtering is performed by a boxcar filter for a square wave modulated baseband signal.

3. The method of claim 1, wherein the combined quasi-baseband data signal is a digital signal comprising a stream of samples and wherein the method further comprises
down-sampling the combined quasi-baseband signal by selecting a first and second subset of samples from said stream of samples, each sample in said second subset of samples being a sample n samples subsequent to a sample selected for said first subset of samples in said stream of samples, n being a selectable integer.

4. The method of claim 3, wherein a third subset of samples is selected, each sample in said third subset of samples being a sample m samples prior to a sample selected for said first subset of samples in said stream of samples, m being a selectable integer.

5. The method of claim 1, further comprising generating for each DSSS source the corresponding spreading code, each spreading code having a fixed de-spread length and a fixed sample rate; and de-spreading each baseband signal with its corresponding spreading code.

6. The method of claim 5, wherein de-spreading each baseband signal with its corresponding spreading code comprises, for each baseband signal:
(i) delivering subsets of the baseband signal and corresponding subsets of the spreading code to each of a plurality of parallel paths;
(ii) computing, on each parallel path, a sum of products, each product formed by multiplying a member of the subset of the baseband signal with a corresponding member of the corresponding subset of the spreading code; and
(iii) summing the sums from each of the plurality of parallel paths.

7. The method of claim 1, further comprising generating, with an analog-to-digital converter, the sequence of digitized samples from an intermediate frequency (IF) signal down-converted from the received superposition.

8. A receiver comprising
a microprocessor configured to perform acts defined by each of a plurality of modules, each module comprising instructions executable by the microprocessor, the plurality of modules comprising:
a carrier removal module configured to remove an IF carrier from the digitized IF signal and output a quasi-baseband spread spectrum signal;
a low pass filter for filtering the output of the carrier removal module;
a sample load module configured to, in a single step:
(i) down-sample the low pass filtered quasi-baseband spread spectrum signal to a fixed-rate down-sampled signal having a sample rate equal to a chip rate of a spreading code; and
(ii) remove a variable Doppler time shift in the filtered combined quasi-base band signal by dynamically adjusting a sample stride of the sample load module;
a Doppler removal module configured to remove the residual frequency shift from the fixed-rate down-sampled signal and output a Doppler removed signal; and a processing module configured to track the Doppler removed signal and obtain said message data at least by de-spreading the Doppler removed signal with the spreading code.

9. The receiver of claim 8, wherein the processing module is further configured to perform phase-locked loop/frequency-locked loop (PLL/FLL) and delay-locked loop (DLL) tracking algorithms and to provide feedback to the sample load module for adjusting the sample stride and the Doppler removal module for residual frequency removal.

10. The receiver of claim 8, further comprising a computer-readable storage medium operably connected to the microprocessor and configured to store the plurality of modules.

11. The receiver of claim 8, further comprising:
a front end to receive and down convert a broadcast radio frequency (RF) signal carrying message data; and
an analog-to-digital converter to digitize the down converted broadcast RF signal and output a digitized intermediate frequency (IF) signal.

12. The receiver of claim 8, wherein the microprocessor further comprises:
a spreading code generator to output a spreading code at a spreading-code sample rate;
a carrier numerically controlled oscillator (NCO) module to generate IF harmonic waves for carrier removal; and
a Doppler NCO module to generate harmonic waves for Doppler removal.

13. A receiver comprising:
a processor configured to perform functions defined by each of a plurality of modules, the plurality of modules comprising:
a carrier removal module configured to remove an IF carrier from the digitized IF signal and output a quasi-baseband spread spectrum signal at a second sample rate;
a low pass filter for filtering the output of the carrier removal module;
a carrier numerically controlled oscillator (NCO) module to generate IF harmonic waves for carrier removal;
a sample load module configured to, in a single step:
(i) down-sample the low pass filtered quasi-baseband spread spectrum signal to a fixed-rate down-sampled signal having a sample rate equal to a chip rate of a spreading-code; and
(ii) remove a variable Doppler time shift in the filtered combined quasi-base band signal by dynamically adjusting a sample stride of the sample load module;
a Doppler removal module configured to remove the residual frequency shift from the fixed-rate down-sampled signal and output a Doppler removed signal; and
a processing module configured to track the Doppler removed signal and obtain said message data at least by de-spreading the Doppler removed signal with the spreading code.

14. The receiver of claim 13, wherein the processor comprises an application- specific integrated circuit (ASIC), the ASIC configured to implement at least one of the plurality of modules.

15. The receiver of claim 13, further comprising a computer-readable storage medium operably connected to the processor, the computer-readable storage medium configured to store instructions for implementing the function of at least one of the modules, the instructions executable by the processor.

16. The receiver of claim 13, wherein the Doppler removal module, the Doppler NCO module and the processing module are provided on each of a plurality of channels, each channel operably connected to a sample load module to receive a respective fixed-rate down-sampled signal.

17. The receiver of claim 13, wherein the processing module includes a de-spreading module to perform the de-spreading the de-spreading module comprising:
  a plurality of parallel paths, each path comprising a first input to receive a subset of samples of the Doppler removed signal, a second input to receive a corresponding subset of samples of the spreading code, a multiplier to multiply each sample of the subset of samples of the Doppler removed signal with a corresponding sample of the corresponding subset of samples of the spreading code and output each resulting product, and an accumulator to output a sum said resulting products; and
  an adder to add the sums output from each accumulator of the plurality of parallel paths.

18. The receiver of claim 13, wherein the receiver is a global positioning system (GPS) receiver, and the spreading code has a fixed de-spread length of 1,023 samples.

19. The receiver of claim 13, further comprising:
  a front end to receive and down convert a broadcast radio frequency (RF) signal carrying message data; and
  an analog-to-digital converter to digitize the down converted broadcast RF signal and output a digitized intermediate frequency (IF) signal.

20. The receiver of claim 13, wherein the microprocessor further compromises:
  a spreading code generator to output a spreading code at a spreading-code sample rate;
  a carrier numerically controlled oscillator (NCO) module to generate IF harmonic waves for carrier removal; and
  a Doppler NCO module to generate harmonic waves for Doppler removal.

21. A non-transitory computer-readable storage medium storing computer-executable modules, each module including computer-executable instructions that, when executed, perform a function, the modules comprising:
  a carrier removal module configured to remove a carrier from an input signal, at least in part by multiplying the input signal by the carrier signal, and output a spread spectrum signal;
  a spreading code module comprising instructions configured to output a spreading code at a first sample rate;
  a sample load module comprising instructions configured to, in a single step:
    (i) down-sample the spread spectrum signal received at a second sample rate, to the first sample rate, and output a fixed-rate down-sampled signal, wherein the fixed rate is equal to a chip rate of the spreading code; and
    (ii) remove a variable Doppler time shift in the filtered combined quasi-base band signal by dynamically adjusting a sample stride of the sample load module;
  a processing module comprising instructions configured to obtain a message signal at least by de-spreading the fixed-rate down-sampled signal with the spreading code.

22. The computer-readable storage medium of claim 21, wherein the carrier removal module further comprises: a low pass filter module to filter the carrier removed signal prior to outputting the spread spectrum signal; and a carrier numerically controlled oscillator (NCO) module to output a carrier signal read from a look-up table.

23. The computer-readable storage medium of claim 22, wherein the low pass filter is a boxcar filter.

24. The computer-readable storage medium of claim 22, wherein the fixed-rate down-sampled signal is among a plurality of fixed-rate down-sampled signals output from the sample load module, and the modules further comprise: a Doppler removal module comprising instructions configured to receive the plurality of fixed-rate down-sampled signals, to remove a Doppler frequency shift from the plurality of fixed-rate down-sampled signals, and output a plurality of Doppler removed fixed-rate down-sampled signals.

25. The computer-readable storage medium of claim 22, wherein the spreading code output by the spreading code module has a fixed de-spread length.

* * * * *